(12) United States Patent
Bi

(10) Patent No.: US 12,524,388 B2
(45) Date of Patent: Jan. 13, 2026

(54) PICTURE STORAGE METHOD AND APPARATUS, AND TERMINAL DEVICE

(71) Applicant: Huawei Technologies Co., Ltd., Shenzhen (CN)

(72) Inventor: Sheng Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/933,586

(22) Filed: Oct. 31, 2024

(65) Prior Publication Data

US 2025/0061106 A1    Feb. 20, 2025

Related U.S. Application Data

(63) Continuation of application No. PCT/CN2023/110077, filed on Jul. 31, 2023.

(30) Foreign Application Priority Data

Aug. 10, 2022    (CN) .................. 202210959305.X

(51) Int. Cl.
*G06F 16/23* (2019.01)
*G06F 16/51* (2019.01)

(52) U.S. Cl.
CPC .......... *G06F 16/2343* (2019.01); *G06F 16/51* (2019.01)

(58) Field of Classification Search
CPC ... G06F 16/2343; G06F 16/51; G06F 16/1774
See application file for complete search history.

(56) References Cited

U.S. PATENT DOCUMENTS

| 9,405,500 B1 * | 8/2016 | Cox ................. G06F 1/1647 |
| 2014/0130182 A1 * | 5/2014 | Yackanich ......... G06Q 30/0269 |
|  |  | 726/27 |
| 2015/0245199 A1 * | 8/2015 | Blitzstein ............ H04W 12/02 |
|  |  | 455/411 |
| 2017/0300260 A1 | 10/2017 | Lv et al. |
| 2023/0394093 A1 * | 12/2023 | Hardy .................. G06F 16/48 |

FOREIGN PATENT DOCUMENTS

| CN | 103377051 A | 10/2013 |
| CN | 103645906 A | 3/2014 |
| CN | 108229203 A | 6/2018 |
| EP | 4002814 A1 | 5/2022 |
| KR | 20140127584 A * | 11/2014 ............. G06F 21/62 |

* cited by examiner

*Primary Examiner* — Hares Jami
(74) *Attorney, Agent, or Firm* — Slater Matsil, LLP

(57) ABSTRACT

Methods, devices, and storage media are provided, including detecting adding a lock to an album stored in a first internal storage area corresponding to a gallery, and in response, adding the lock to the album and starting a system application corresponding to the lock, sending a picture name in the album to the system application through a file opening interface between the gallery and the system application, and where a second internal storage area corresponding to the system application does not include a picture file for the picture name, creating the picture file in the second internal storage area, obtaining a first file descriptor of the picture file, and returning the descriptor to the gallery, obtaining picture content written by the gallery into the second internal storage area based on the descriptor, disabling the file opening interface, and storing the picture content in the second internal storage area.

20 Claims, 28 Drawing Sheets

CONT. FROM FIG. 20A

PICTURE STORAGE METHOD AND APPARATUS, AND TERMINAL DEVICE

CROSS-REFERENCE TO RELATED APPLICATIONS

This application is a continuation of International Application No. PCT/CN2023/110077 filed on Jul. 31, 2023, which claims priority to Chinese Patent Application No. 202210959305.X, filed on Aug. 10, 2022. The disclosures of the aforementioned applications are hereby incorporated by reference in their entireties.

TECHNICAL FIELD

Embodiments of this application relate to the field of intelligent terminal technologies, and in particular, to a picture storage method and apparatus, and a terminal device.

BACKGROUND

Pictures are important personal data. In many scenarios, a user may require privacy processing on some pictures to prevent others from viewing, modifying, or deleting the pictures.

In an implementation solution provided in the conventional technology, pictures may be encrypted in an encryption manner. Specifically, an entry of an encrypted album may be added to an album, and each picture that is moved by the user into the encrypted album is encrypted. After the picture is encrypted, only a current application can decrypt the picture, and then the picture is displayed normally.

However, in this manner, the picture is under a risk of being deleted. After the picture is encrypted, although the user cannot add or view the encrypted picture from another entry, the user can delete the picture at another entry. Similarly, the user may further perform other processing on the encrypted picture through another entry, for example, encrypt the picture again by using another application. As a result, the user cannot view the picture after entering the entry of the encrypted album. In addition, picture encryption or decryption consumes computing power of a central processing unit (CPU), and consumes time. For example, if the user moves 100 photos into the encrypted album at a time, the user needs to wait for extra time for encryption because an encryption algorithm is time-consuming.

SUMMARY

Embodiments of this application provide a picture storage method and apparatus, and a terminal device, and further provide a computer-readable storage medium, so that a picture is stored in a locked manner without encryption, decryption, or additional calculation. In addition, even if a user clears data of a gallery, the terminal device can still retain the picture stored in the locked manner.

According to a first aspect, an embodiment of this application provides a picture storage method, including: detecting a first trigger operation of adding an album lock to a target album by a user, where the target album is stored in a first internal storage area corresponding to a gallery; in response to the first trigger operation, adding the album lock to the target album, and starting a system application corresponding to the album lock; sending a picture name in the target album to the system application through a file opening interface between the gallery and the system application; if a second internal storage area corresponding to the system application does not include a picture file corresponding to the picture name, creating the picture file in the second internal storage area, obtaining a first file descriptor of the picture file, and returning the first file descriptor of the picture file to the gallery; obtaining picture content written by the gallery into the second internal storage area based on the first file descriptor; and disabling the file opening interface, and storing the picture content in the second internal storage area.

In the foregoing picture storage method, a terminal device detects the first trigger operation of adding the album lock to the target album by the user, adds the album lock to the target album in response to the first trigger operation, starts the system application corresponding to the album lock, and then sends the picture name in the target album to the system application through the file opening interface between the gallery and the system application. If the second internal storage area corresponding to the system application does not include the picture file corresponding to the picture name, the terminal device creates the picture file in the second internal storage area, obtains the first file descriptor of the picture file, and returns the first file descriptor of the picture file to the gallery. Finally, the terminal device obtains the picture content written by the gallery into the second internal storage area based on the first file descriptor, disables the file opening interface, and stores the picture content in the second internal storage area. In this way, the terminal device can store a picture in a locked manner without encryption, decryption, or additional calculation. In addition, even if the user clears data of the gallery, only the first internal storage area corresponding to the gallery is cleared. Because the picture content is also stored in the second internal storage area corresponding to the system application, the terminal device still retains the picture stored in the locked manner.

In a possible implementation, after the disabling the file opening interface, and storing the picture content in the second internal storage area, the method further includes: detecting a second trigger operation of unlocking the target album by the user; in response to the second trigger operation, obtaining unlocking information entered by the user; and after it is determined that security verification on the unlocking information succeeds, obtaining, based on an identifier of the target album, the picture name included in the target album; transferring a to-be-viewed picture name to the system application through the file opening interface; after the system application opens a to-be-viewed picture file the based on the to-be-viewed picture name, obtaining a second file descriptor that is of the to-be-viewed picture file and that is returned by the system application; and reading and displaying to-be-viewed picture content based on the second file descriptor by using the gallery.

In a possible implementation, after the obtaining the picture name included in the target album, the method further includes: transferring a picture name of to-be-modified picture content to the system application through the file opening interface; after the system application opens a picture file of the to-be-modified picture content based on the picture name of the to-be-modified picture content, obtaining a third file descriptor that is of the picture file of the to-be-modified picture content and that is returned by the system application; reading and displaying the to-be-modified picture content based on the third file descriptor by using the gallery; modifying the to-be-modified picture content by using the gallery; and storing modified picture content in the second internal storage area based on the third file descriptor by using the gallery.

In a possible implementation, after the obtaining the picture name included in the target album, the method further includes: obtaining a picture name of to-be-modified picture file information by using the gallery; modifying the to-be-modified picture file information by using the gallery; and transferring the picture name of the to-be-modified picture file information and modified picture file information to the system application through a picture information modification interface between the gallery and the system application, so that after finding a picture file corresponding to the picture name of the to-be-modified picture file information, the system application replaces file information of the found picture file with the modified picture file information.

In a possible implementation, after the obtaining the picture name included in the target album, the method further includes: obtaining a to-be-deleted picture name by using the gallery; and transferring the to-be-deleted picture name to the system application through a picture deletion interface between the gallery and the system application, so that the system application deletes a picture file corresponding to the to-be-deleted picture name.

In a possible implementation, after the adding the album lock to the target album, the method further includes: detecting a third trigger operation of removing the album lock of the target album by the user; in response to the third trigger operation, obtaining unlocking information entered by the user; and after it is determined that security verification on the unlocking information succeeds, removing the album lock for the target album.

In a possible implementation, a storage area clearing entry of the system application is in a user-invisible state.

According to a second aspect, an embodiment of this application provides a picture storage apparatus. The apparatus is included in a terminal device, and the apparatus has a function of implementing behaviors of the terminal device in the first aspect and the possible implementations of the first aspect. The function may be implemented by hardware, or may be implemented by executing corresponding software by hardware. The hardware or the software includes one or more modules or units corresponding to the foregoing function, for example, a detection module, an add module, a starting module, a transmission module, an obtaining module, and a storage module.

According to a third aspect, an embodiment of this application provides a terminal device, including: one or more processors, a memory, a plurality of applications, and one or more computer programs, where the one or more computer programs are stored in the memory, the one or more computer programs include instructions, and when the instructions are executed by the terminal device, the terminal device performs the following steps: detecting a first trigger operation of adding an album lock to a target album by a user, where the target album is stored in a first internal storage area corresponding to a gallery; in response to the first trigger operation, adding the album lock to the target album, and starting a system application corresponding to the album lock; sending a picture name in the target album to the system application through a file opening interface between the gallery and the system application; if a second internal storage area corresponding to the system application does not include a picture file corresponding to the picture name, creating the picture file in the second internal storage area, obtaining a first file descriptor of the picture file, and returning the first file descriptor of the picture file to the gallery; obtaining picture content written by the gallery into the second internal storage area based on the first file descriptor; and disabling the file opening interface, and storing the picture content in the second internal storage area.

In a possible implementation, when the instructions are executed by the terminal device, after performing the step of disabling the file opening interface, and storing the picture content in the second internal storage area, the terminal device further performs the following steps: detecting a second trigger operation of unlocking the target album by the user; in response to the second trigger operation, obtaining unlocking information entered by the user; and after it is determined that security verification on the unlocking information succeeds, obtaining, based on an identifier of the target album, the picture name included in the target album; transferring a to-be-viewed picture name to the system application through the file opening interface; after the system application opens a to-be-viewed picture file based on the to-be-viewed picture name, obtaining a second file descriptor that is of the to-be-viewed picture file and that is returned by the system application; and reading and displaying to-be-viewed picture content based on the second file descriptor by using the gallery.

In a possible implementation, when the instructions are executed by the terminal device, after performing the step of obtaining the picture name included in the target album, the terminal device further performs the following steps: transferring a picture name of to-be-modified picture content to the system application through the file opening interface; after the system application opens a picture file of the to-be-modified picture content based on the picture name of the to-be-modified picture content, obtaining a third file descriptor that is of the picture file of the to-be-modified picture content and that is returned by the system application; reading and displaying the to-be-modified picture content based on the third file descriptor by using the gallery; modifying the to-be-modified picture content by using the gallery; and storing modified picture content in the second internal storage area based on the third file descriptor by using the gallery.

In a possible implementation, when the instructions are executed by the terminal device, after performing the step of obtaining the picture name included in the target album, the terminal device further performs the following steps: obtaining a picture name of to-be-modified picture file information by using the gallery; modifying the to-be-modified picture file information by using the gallery; transferring the picture name of the to-be-modified picture file information and modified picture file information to the system application through a picture information modification interface between the gallery and the system application, so that after finding a picture file corresponding to the picture name of the to-be-modified picture file information, the system application replaces file information of the found picture file with the modified picture file information.

In a possible implementation, when the instructions are executed by the terminal device, after performing the step of obtaining the picture name included in the target album, the terminal device further performs the following steps: obtaining a to-be-deleted picture name by using the gallery; and transferring the to-be-deleted picture name to the system application through a picture deletion interface between the gallery and the system application, so that the system application deletes a picture file corresponding to the to-be-deleted picture name.

In a possible implementation, when the instructions are executed by the terminal device, after performing the step of adding the album lock to the target album, the terminal device further performs the following steps: detecting a third trigger operation of removing the album lock of the target album by the user; in response to the third trigger operation, obtaining unlocking information entered by the user; and after it is determined that security verification on the unlocking information succeeds, removing the album lock for the target album.

It should be understood that technical solutions in the second aspect and the third aspect of embodiments of this application are consistent with the technical solution in the first aspect of embodiments of this application, and beneficial effect achieved by the aspects and corresponding feasible embodiments is similar. Details are not described again.

According to a fourth aspect, an embodiment of this application provides a computer-readable storage medium. The computer-readable storage medium stores a computer program, and when the computer program is run on a computer, the computer is enabled to perform the method provided in the first aspect.

According to a fifth aspect, an embodiment of this application provides a computer program. When the computer program is executed by a computer, the computer program is used to perform the method according to the first aspect.

In a possible design, some or all of the programs in the fifth aspect may be stored in a storage medium packaged together with a processor, or may be stored in a memory not packaged together with a processor.

DESCRIPTION OF ILLUSTRATIVE EMBODIMENTS

Terms used in embodiments of this application are only used to explain specific embodiments of this application, but are not intended to limit this application.

For a problem of how to perform privacy processing on a picture, a solution provided in the conventional technology is to encrypt the picture in an encryption manner. However, in this manner, the picture is under a risk of being deleted, and picture encryption and decryption consumes computing power of a CPU and time.

Figure 1:
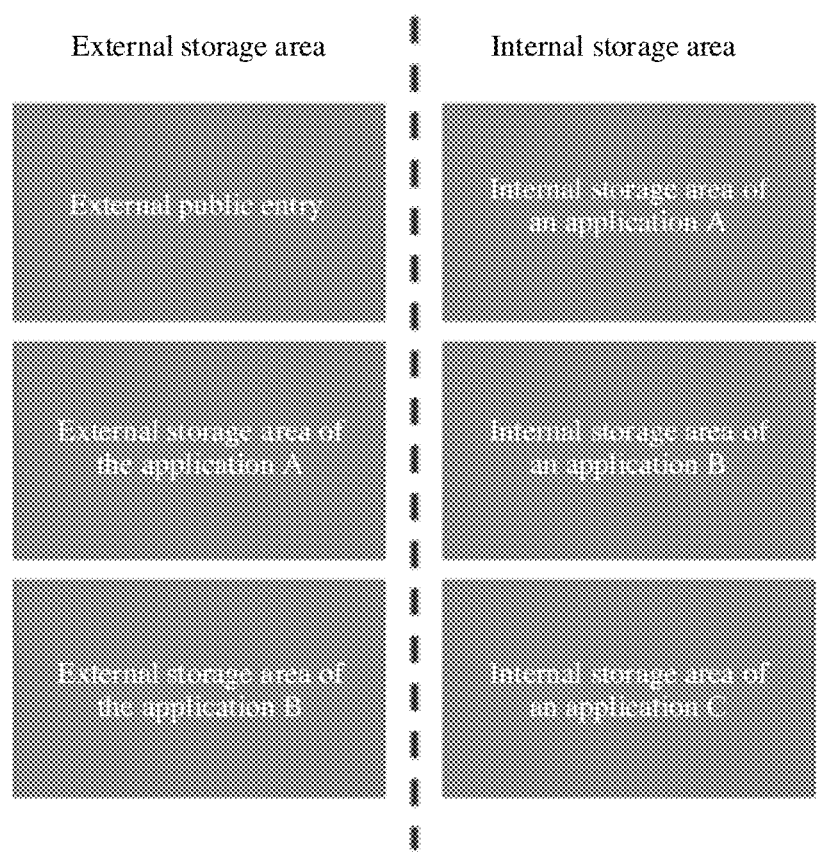
FIG. 1 is a diagram of division of a storage area of an application in the conventional technology.

A solution provided in the conventional technology is to store a picture in an encryption manner by using an internal storage area mechanism. To be specific, in a current mobile phone system, the system divides a storage area of an application into an external storage area of the application, an external public directory storage area, and an internal storage area of the application. FIG. 1 is a diagram of division of a storage area of an application in the conventional technology.

Any application can access an external storage area of the application in FIG. 1, but for an internal storage area of the application, each application can access only an internal storage area of the application.

After an application stores a picture in a locked album into an internal storage area of the application, another application cannot access the picture. However, in terms of an operating system, this solution has the following disadvantages.

Figure 2:
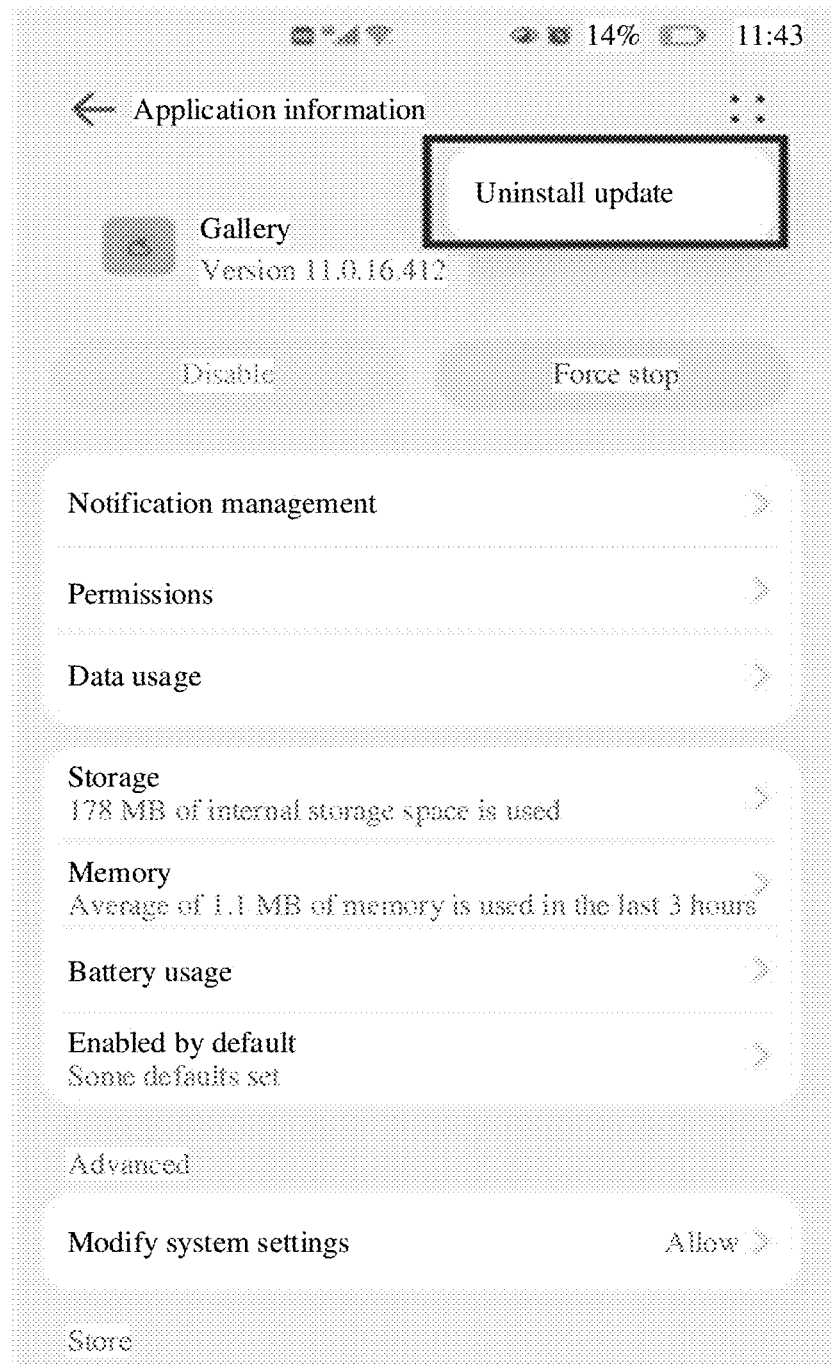
FIG. 2 is a diagram of providing an uninstallation entry in system settings in the conventional technology.
Figure 3:
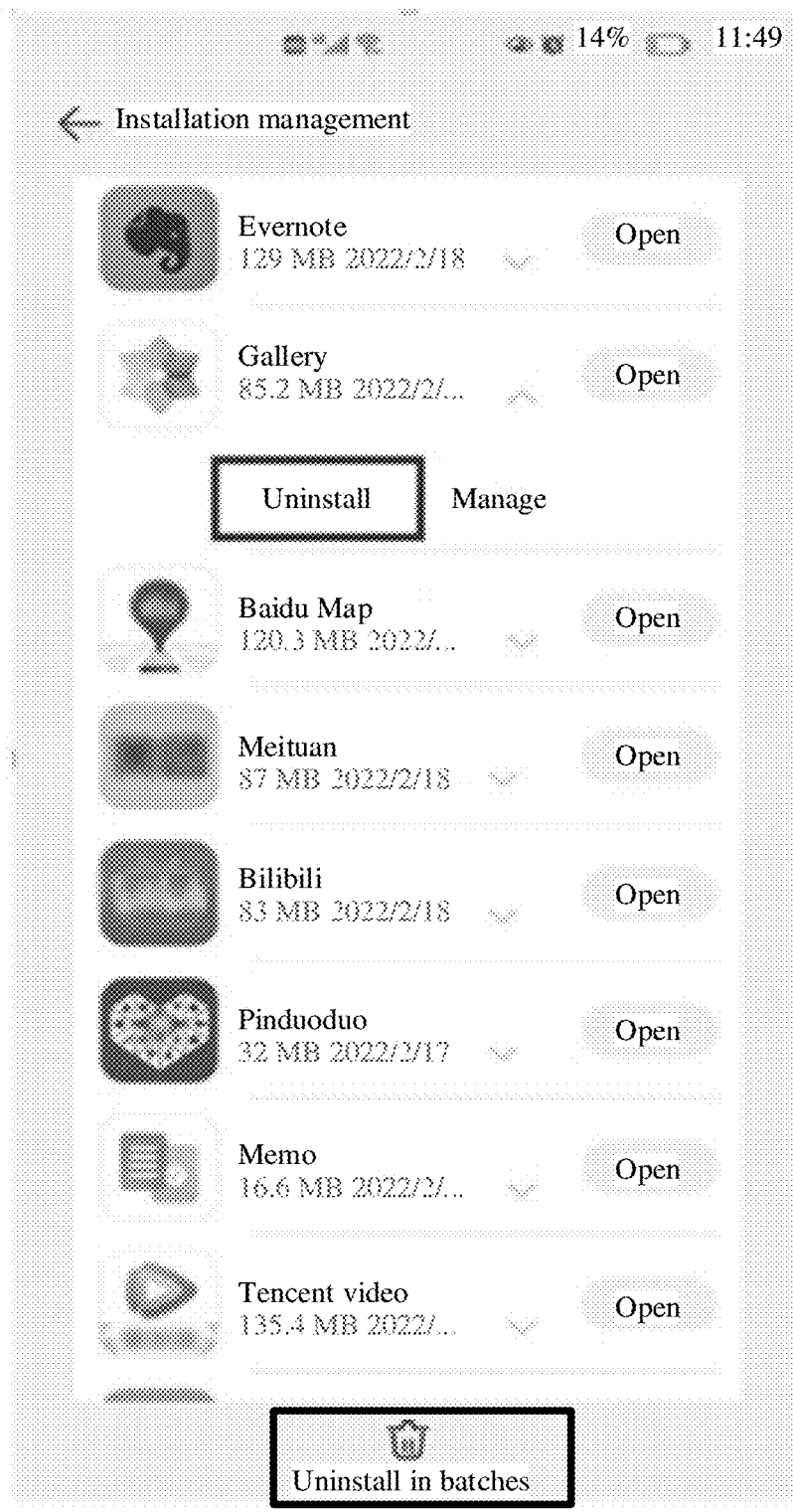
FIG. 3 is a diagram of providing an uninstallation entry in an application store in the conventional technology.

Disadvantage 1: Internal storage data can be deleted through uninstallation. An operating system provides an uninstallation entry in system settings or another setting, and a user can uninstall, from the entry, an application installed on a current mobile phone. As shown in FIG. 2 and FIG. 3, FIG. 2 is a diagram of providing an uninstallation entry in system settings in the conventional technology, and FIG. 3 is a diagram of providing an uninstallation entry in an application store in the conventional technology.

The user may uninstall an application through the uninstallation entries shown in FIG. 2 and FIG. 3. After the application is uninstalled, the operating system clears data in an internal storage area of the application. As a result, a picture in a locked album is deleted.

Figure 4:
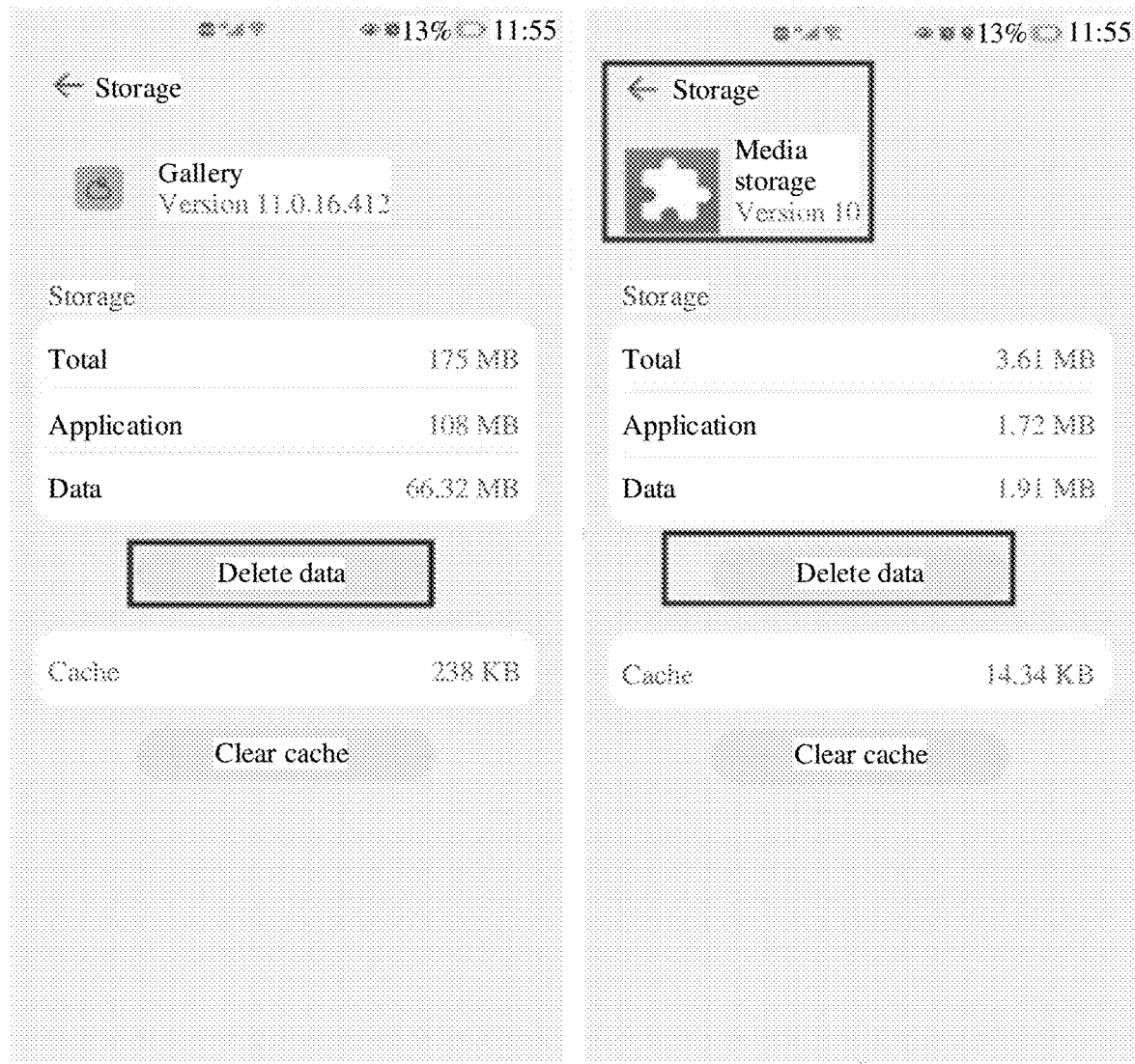
FIG. 4 is a diagram of an application data clearing entry in the conventional technology.

Disadvantage 2: The user can delete a picture in a locked album by clearing application data, and the operating system provides a picture data clearing entry in settings. FIG. 4 is a diagram of an application data clearing entry in the conventional technology.

Internal storage data in a gallery and a media library of a system can be cleared by using a Delete data button shown in FIG. 4. Applications such as the gallery and the media library are special, and include a large amount of system data. If an error occurs, restorable measures are required. Therefore, the operating system considers that this entry for deleting data needs to be retained.

In conclusion, in the two disadvantages, the user can bypass an entry of the locked album and directly delete the picture in the locked album.

In view of the foregoing problems, embodiments of this application provide a picture storage method, so that a picture is stored in a locked manner. In the picture storage method, no encryption algorithm is used, and no encryption, decryption, and additional calculation are required in a picture storage process. In addition, in embodiments of this application, a user can access, add, delete, and/or modify a locked picture only through an entry of a locked album in a gallery.

In embodiments of this application, resources of an operating system are fully used, and a new implementation is proposed, so that the locked album in the gallery can still be retained after the gallery application is uninstalled, and the locked album in the gallery can still be retained when the user clears data of the gallery.

The picture storage method provided in embodiments of this application may be applied to a terminal device. The terminal device may be a smart mobile phone, a tablet computer, a wearable device, an in-vehicle device, an augmented reality (AR) device/a virtual reality (VR) device, a notebook computer, an ultra-mobile personal computer (UMPC), a netbook, a personal digital assistant (PDA), or the like. A specific type of the terminal device is not limited in embodiments of this application.

Figure 5:
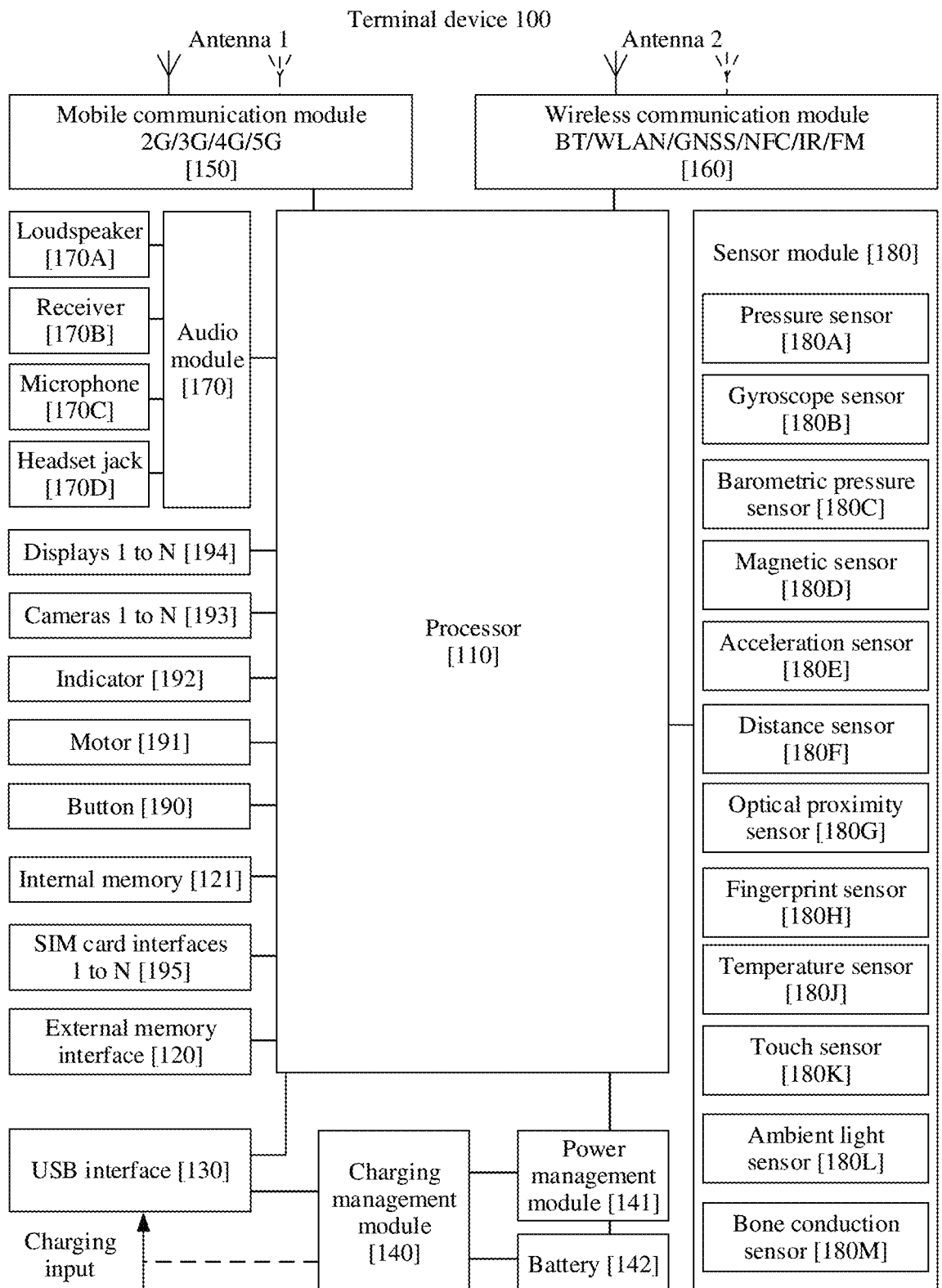
FIG. 5 is a diagram of a structure of a terminal device according to an embodiment of this application.

For example, FIG. 5 is a diagram of a structure of a terminal device according to an embodiment of this application. As shown in FIG. 5, a terminal device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a loudspeaker 170A, a receiver 170B, a microphone 170C, a headset jack 170D, a sensor module 180, a button 190, a motor 191, an indicator 192, a camera 193, a display 194, and a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the terminal device 100. In some other embodiments of this application, the terminal device 100 may include more or fewer components than those shown in the figure, or some components may be combined, or some components may be divided, or a different component arrangement may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent devices, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one derail clock line (DCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communication module 160 through the I2S interface, to implement a function of answering a call through a Bluetooth headset.

The PCM interface may also be used for audio communication, and samples, quantizes, and encodes an analog signal. In some embodiments, the audio module 170 may be coupled to the wireless communication module 160 through a PCM bus interface. In some embodiments, the audio module 170 may alternatively transfer an audio signal to the wireless communication module 160 through the PCM interface, to implement a function of answering a call through a Bluetooth headset. Both the I2S interface and the PCM interface may be used for audio communication.

The UART interface is a universal serial data bus used for asynchronous communication. The bus may be a two-way communication bus. The UART interface converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface, to implement a function of playing music through a Bluetooth headset.

The MIPI interface may be configured to connect the processor 110 to a peripheral device like the display 194 or the camera 193. The MIPI interface includes a camera serial interface (CSI), a display serial interface (DSI), and the like. In some embodiments, the processor 110 communicates with the camera 193 through the CSI, to implement a photographing function of the terminal device 100. The processor 110 communicates with the display 194 through the DSI interface, to implement a display function of the terminal device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that meets a USB standard specification, and may be specifically a mini USB interface, a micro USB interface, a USB type C interface, or the like. The USB interface 130 may be used to connect to the charger to charge the terminal device 100, or may be used to transmit data between the terminal device 100 and a peripheral device, or may be configured to connect to a headset for playing audio through the headset. The interface may be further configured to connect to another electronic device like an AR device.

It can be understood that an interface connection relationship between the modules shown in this embodiment of this application is merely an example for description, and constitutes no limitation on the structure of the terminal device 100. In some other embodiments of this application, different interface connection manners in the foregoing embodiments or a combination of a plurality of interface connection manners may alternatively be used for the terminal device 100.

The charging management module 140 is configured to receive charging input from a charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the terminal device 100. The charging management module 140 may further supply power to the terminal device 100 by using the power management module 141 while charging the battery 142.

The power management module 141 is configured to connect to the battery 142, the charging management module 140, and the processor 110. The power management module 141 receives input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (e.g., an electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a solution applied to the terminal device 100 for wireless communication including 2G/3G/4G/5G and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transferred to the application processor. The application processor outputs a sound signal by using an audio device (which is not limited to the loudspeaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another function module.

The wireless communication module 160 may provide a solution applied to the terminal device 100 for wireless communication including a wireless local area network (WLAN) (like a wireless fidelity (Wi-Fi) network), Bluetooth (BT), a global navigation satellite system (GNSS), frequency modulation (FM), a near field communication (NFC) technology, an infrared (IR) technology, and the like.

The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the terminal device 100 are coupled, and the antenna 2 and the wireless communication module 160 in the terminal device 100 are coupled, so that the terminal device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and the GPUs execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flex light-emitting diode (FLED), a mini-LED, a micro-LED, a micro-OLED, a quantum dot light emitting diode (QLED), or the like. In some embodiments, the terminal device 100 may include one or N displays 194, where N is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of an image shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) optoelectronic transistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format like RGB or YUV. In some embodiments, the terminal device 100 may include one or N cameras 193, where N is a positive integer greater than 1.

The digital signal processor is configured to process a digital signal, and can further process another digital signal in addition to the digital image signal. For example, when the terminal device 100 selects a frequency, the digital signal processor is configured to perform Fourier transformation on frequency energy.

The video codec is configured to compress or decompress a digital video. The terminal device 100 may support one or more video codecs. Therefore, the terminal device 100 can play or record videos in a plurality of coding formats, for example, moving picture experts group (MPEG)-1, MPEG-2, MPEG-3, and MPEG-4.

The NPU is a neural-network (NN) computing processor, and simulates a biological neural network structure like a transmission mode between neurons in a human brain to perform rapid processing on input information, and can perform continuous self-learning. The NPU may be used to implement applications such as intelligent cognition of the terminal device 100, for example, image recognition, facial recognition, voice recognition, and text understanding.

The external memory interface 120 may be configured to connect to an external storage card, for example, a micro SD card, to extend a storage capability of the terminal device 100. The external storage card communicates with the processor 110 through the external memory interface 120, to implement a data storage function. For example, a music file or a video file is stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data created in a process of using the terminal device 100 (for example, audio data or an address book), and the like. In addition, the internal memory 121 may include a high-speed random access memory, or may include a non-volatile memory, for example, at least one magnetic disk storage device, a flash memory, or a universal flash storage (UFS). The processor 110 runs the instructions stored in the internal memory 121, and/or instructions stored in the memory disposed in the processor, to execute various function applications and data processing of the terminal device 100.

The terminal device 100 may implement an audio function like music playing or recording through the audio module 170, the loudspeaker 170A, the receiver 170B, the microphone 170C, the headset jack 170D, the application processor, and the like.

The audio module 170 is configured to convert digital audio information into an analog audio signal for output, and is further configured to convert analog audio input into a digital audio signal. The audio module 170 may be further configured to code and decode an audio signal. In some embodiments, the audio module 170 may be disposed in the processor 110, or some function modules in the audio module 170 are disposed in the processor 110.

The loudspeaker 170A, also referred to as a "speaker", is configured to convert an audio electrical signal into a sound signal. The terminal device 100 may be configured to listen to music or answer a call in a hands-free mode by using the loudspeaker 170A.

The receiver 170B, also referred to as an "earpiece", is configured to convert an electrical audio signal into a sound signal. When a call is answered or a voice message is received by using the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to implement a noise reduction function in addition to collecting a sound signal. In some other embodiments, three, four, or more microphones 170C may alternatively be disposed in the terminal device 100, to collect a sound signal, implement noise reduction, and identify a sound source, to implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure intensity based on a change in the capacitance. When a touch operation is performed on the display 194, the terminal device 100 detects intensity of the touch operation through the pressure sensor 180A. The terminal device 100 may further calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the terminal device 100. In some embodiments, an angular velocity of the terminal device 100 around three axes (that is, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and allows the lens to cancel jitter of the terminal device 100 through reverse motion, to implement image stabilization. The gyroscope sensor 180B may further be used in a navigation scenario and a somatic game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip leather case by using the magnetic sensor 180D. In some embodiments, when the terminal device 100 is a flip phone, the terminal device 100 may detect opening and closing of a flip cover based on the magnetic sensor 180D. Further, a feature like automatic unlocking of the flip cover is set based on a detected opening or closing state of the leather case or a detected opening or closing state of the flip cover.

The acceleration sensor 180E may detect magnitudes of accelerations of the terminal device 100 in various directions (usually along the three axes). When the terminal device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The terminal device 100 may measure the distance in an infrared manner or a laser manner. In some embodiments, in a photographing scenario, the terminal device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The terminal device 100 emits infrared light by using the light-emitting diode. The terminal device 100 detects infrared reflected light from a nearby object by using the photodiode. When sufficient reflected light is detected, it may be determined that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear to make a call, to automatically perform screen-off for power saving. The optical proximity sensor 180G may further be used in a leather case mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may further be configured to automatically adjust white balance during photographing. The ambient light sensor 180L may further cooperate with the optical proximity sensor 180G to detect whether the terminal device 100 is in a pocket, to avoid an accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy based on the temperature detected by the temperature sensor 180J. For example, when the temperature reported by the temperature sensor 180J exceeds a threshold, the terminal device 100 lowers performance of a processor near the temperature sensor 180J, to reduce power consumption and implement thermal protection. In some other embodiments, when the temperature is less than another threshold, the terminal device 100 heats the battery 142 to prevent the terminal device 100 from being shut down abnormally due to a low temperature. In some other embodiments, when the temperature is less than still another threshold, the terminal device 100 boosts an output voltage of the battery 142, to avoid abnormal shutdown caused by a low temperature.

The touch sensor 180K is also referred to as a "touch device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. Visual output related to the touch operation may be provided through the display 194. In some other embodiments, the touch sensor 180K may alternatively be disposed on a surface of the terminal device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further be in contact with a human pulse, to receive a blood pressure beating signal. In some embodiments, the bone conduction sensor 180M may alternatively be disposed in a headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive input from the button, and generate button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effect. The motor 191 may further correspond to different vibration feedback effect for touch operations performed on different areas of the display 194. Different application scenarios (for example, a time reminder, information receiving, an alarm clock, and a game) may further correspond to different vibration feedback effect. The touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is further compatible with an external storage card. The terminal device 100 interacts with a network by using the SIM card, to implement functions such as conversation and data communication. In some embodiments, an eSIM, namely, an embedded SIM card, is used for the terminal device 100. The eSIM card may be embedded into the terminal device 100, and cannot be separated from the terminal device 100.

A layered architecture, an event-driven architecture, a microkernel architecture, a microservice architecture, or a cloud architecture may be used for a software system of the terminal device 100. In this embodiment of this application, an Android system with a layered architecture is used as an example to illustrate a software structure of the terminal device 100.

For ease of understanding, in the following embodiments of this application, the terminal device having the structure shown in FIG. 5 is used as an example to describe in detail the picture storage method provided in embodiments of this application with reference to the accompanying drawings and application scenarios.

First, a process in which a user adds an album lock is described.

Figure 6:
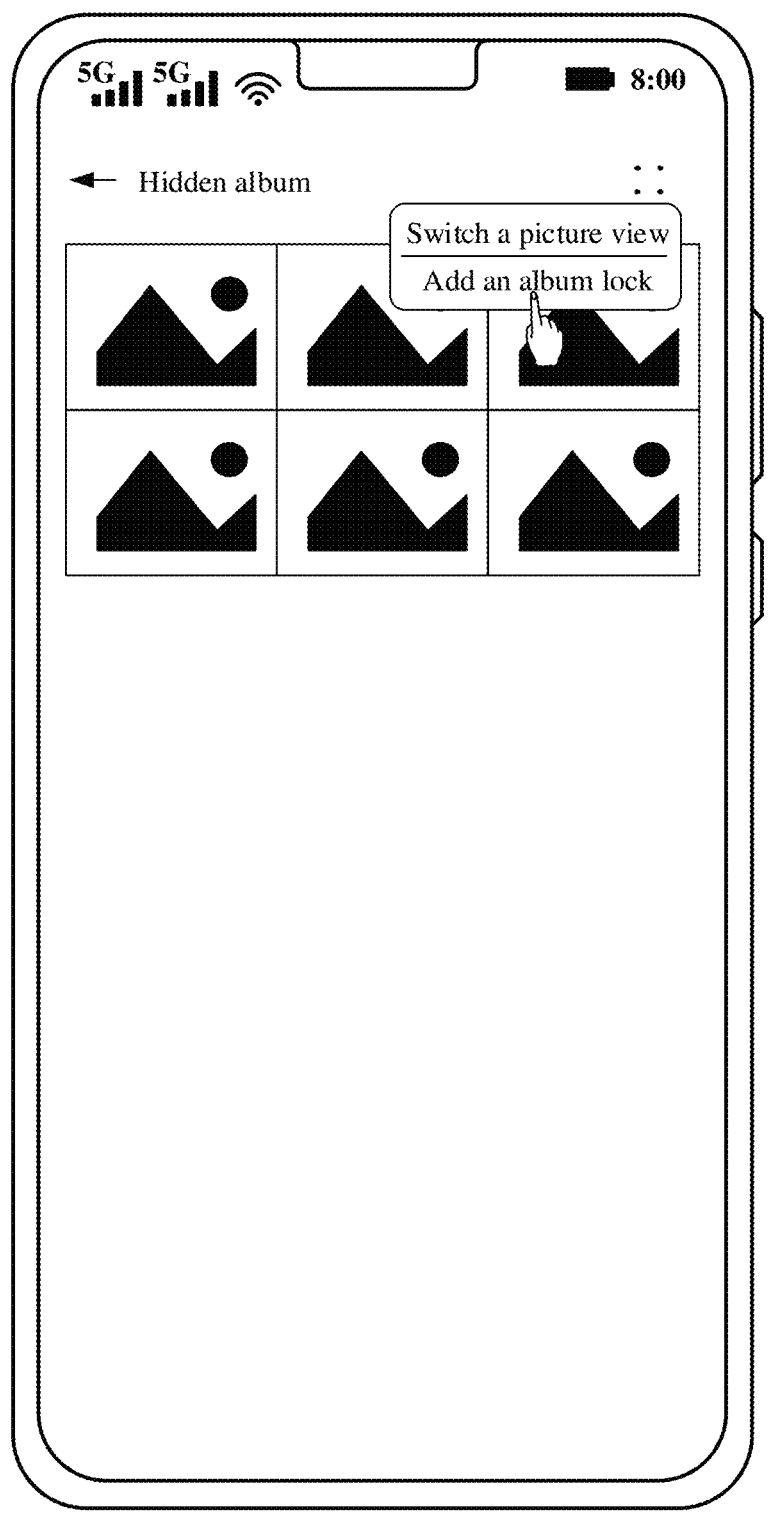
FIG. 6 is a diagram of an interface for triggering addition of an album lock according to an embodiment of this application.
Figure 7:
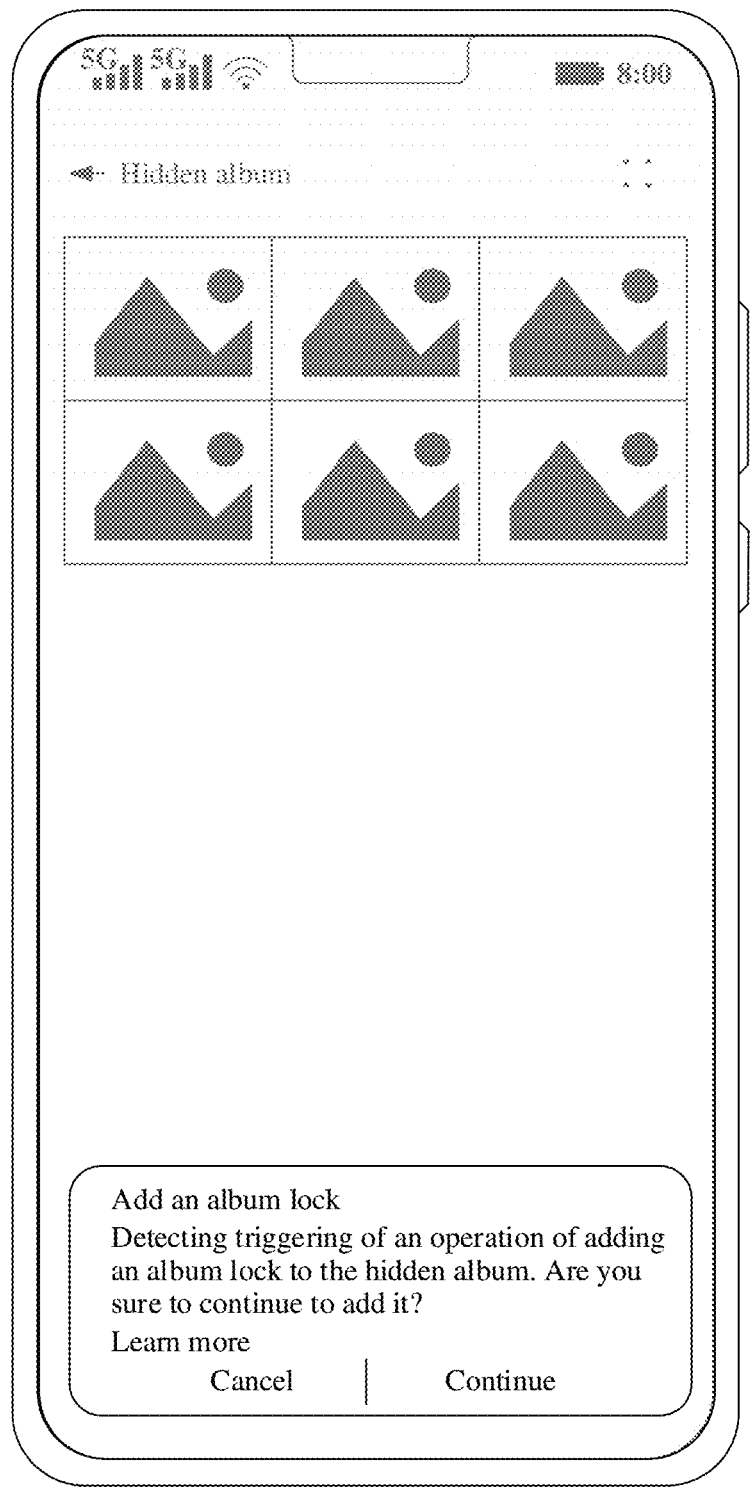
FIG. 7 is a diagram of an interface of a disclaimer prompt of an album lock according to an embodiment of this application.

When browsing an album in a gallery, the user may tap a menu to add an album lock to the album. FIG. 6 is a diagram of an interface for triggering addition of the album lock according to an embodiment of this application. If the album lock is added for the first time, a disclaimer prompt is displayed correspondingly. FIG. 7 is a diagram of an interface of the disclaimer prompt of the album lock according to an embodiment of this application.

Figure 8A:
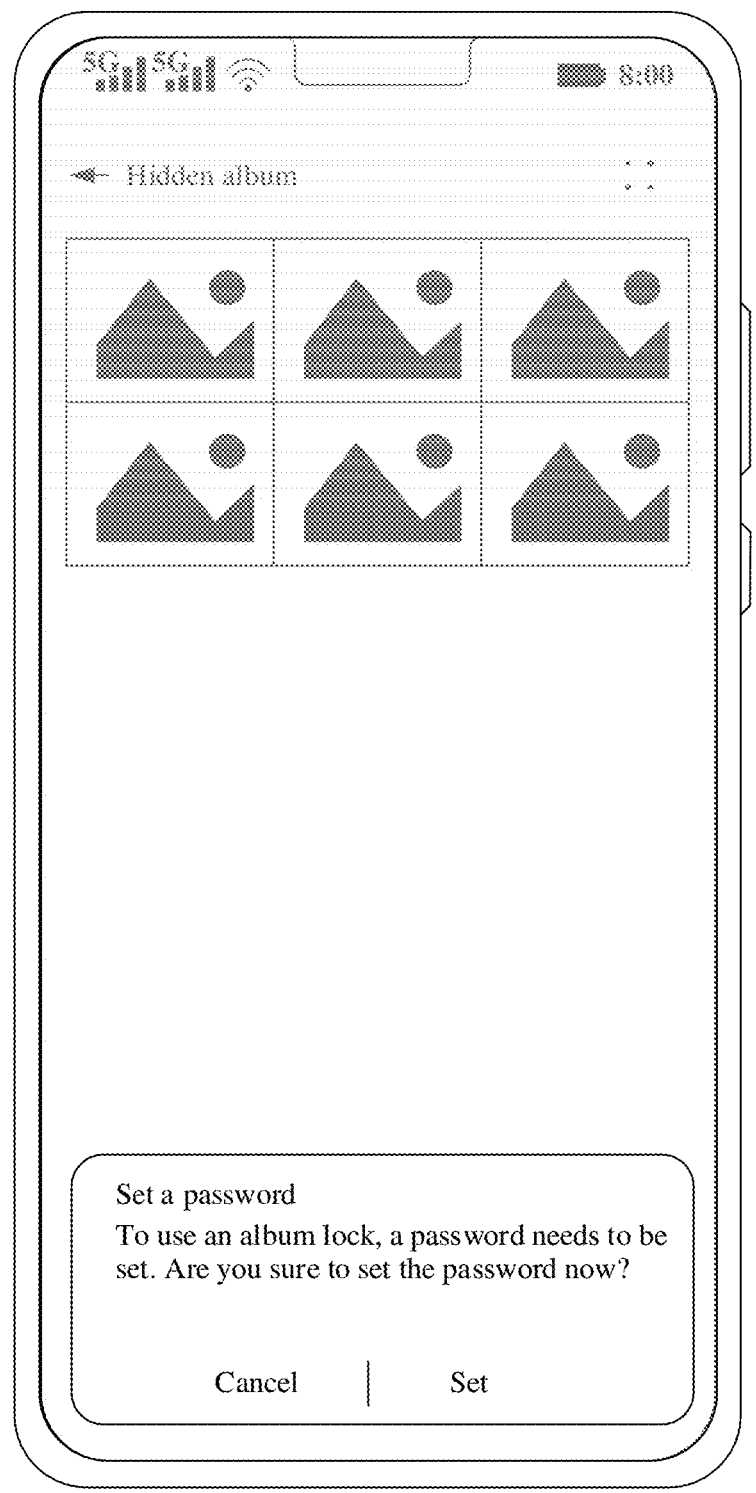
FIG. 8(a) to FIG. 8(c) are diagrams of interfaces for setting a password of an album lock according to an embodiment of this application.
Figure 8B:
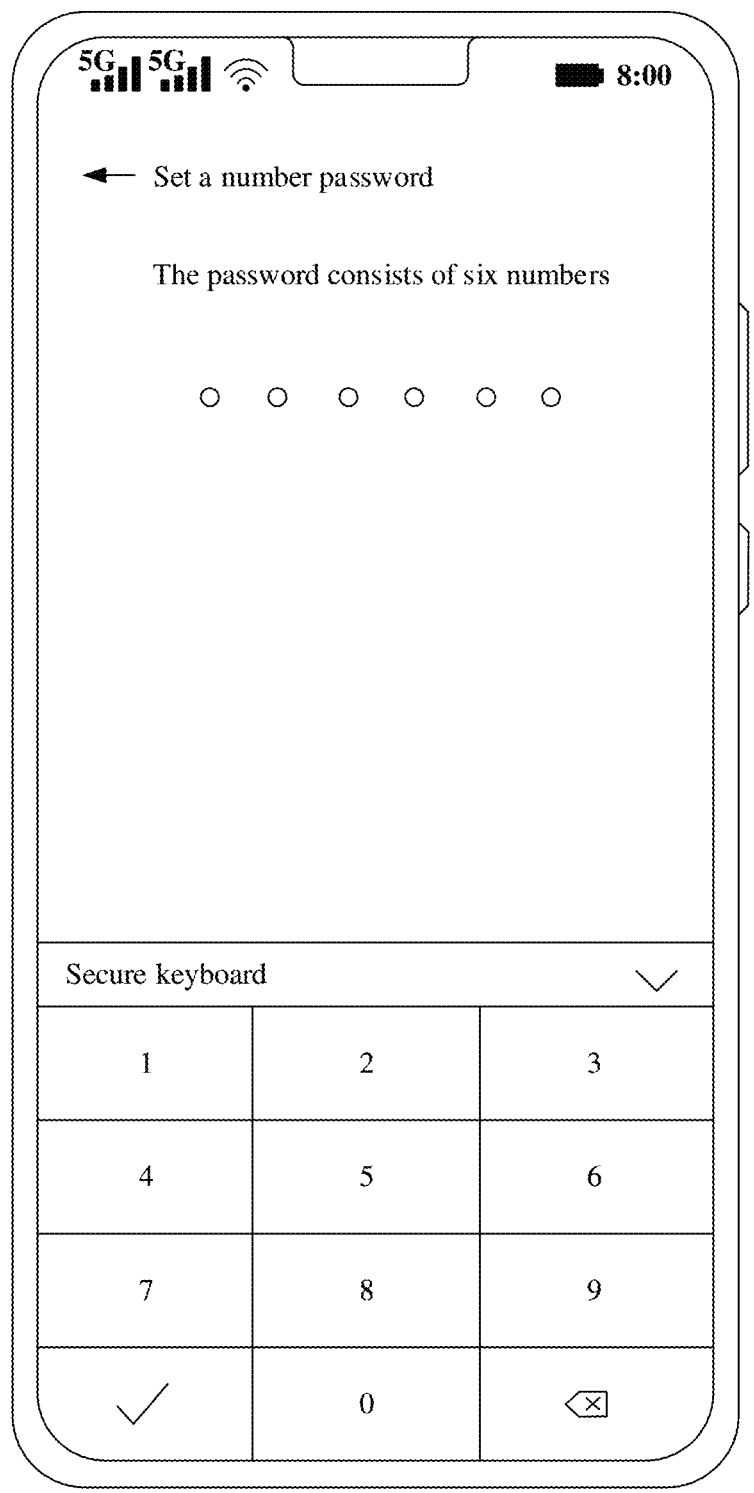
Figure 8C:
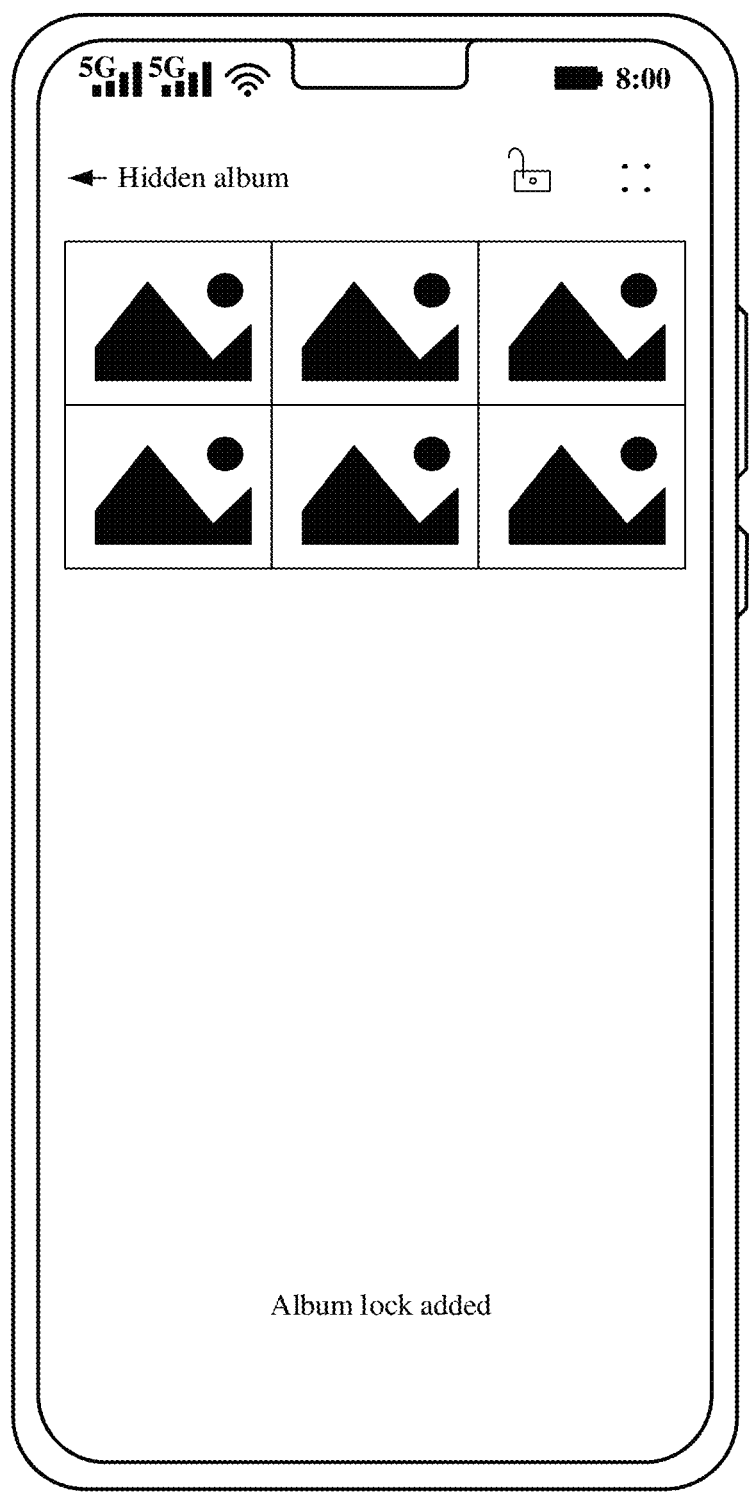

In the interface shown in FIG. 7, if the user taps "Continue", the terminal device 100 may obtain a confirmation indication of the user, and then the terminal device 100 may display an interface for entering a password. After obtaining the password entered by the user, the terminal device 100 completes an operation of adding the album lock to the album. FIG. 8(a) to FIG. 8(c) are diagrams of interfaces for setting the password of the album lock according to an embodiment of this application.

Figure 9A:
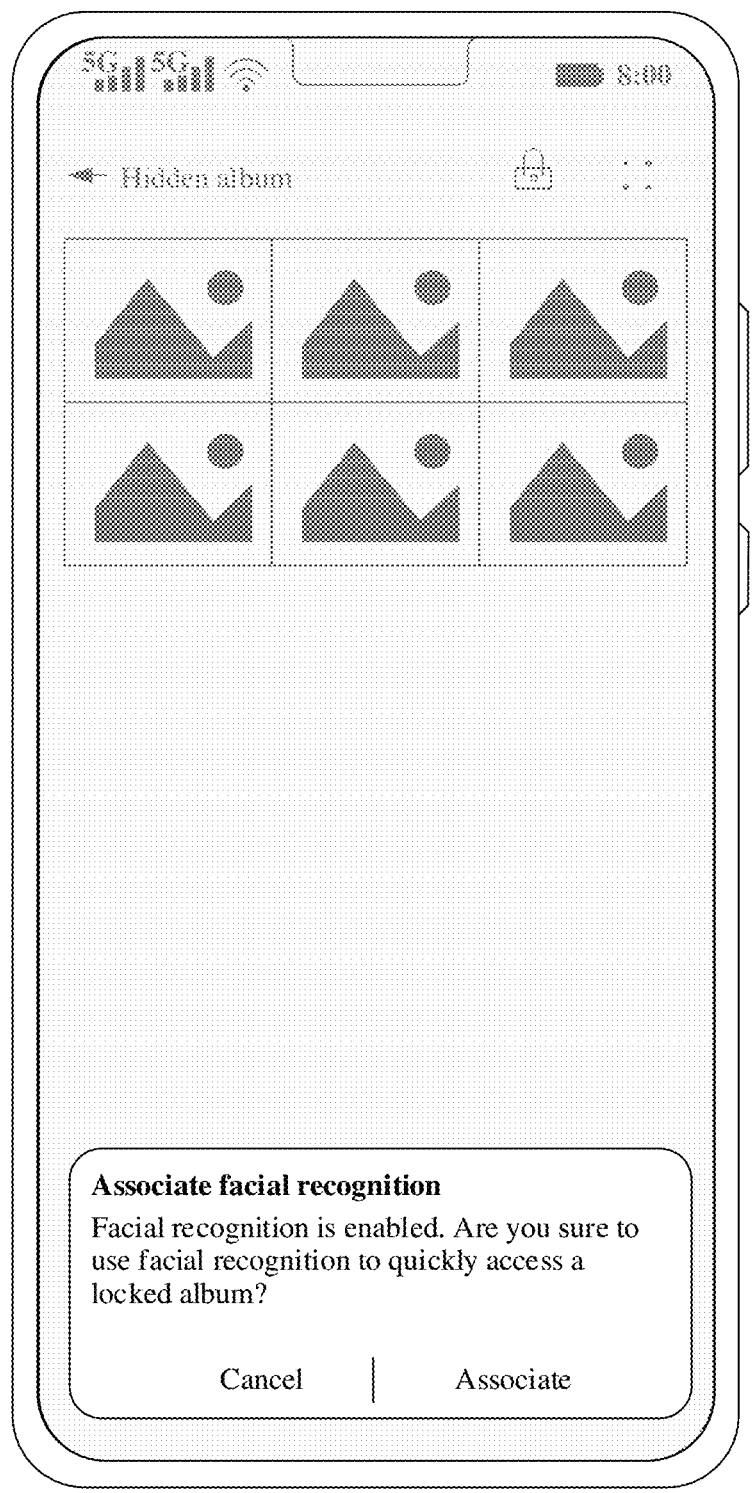
FIG. 9(a) and FIG. 9(b) are diagrams of interfaces of biometric recognition association according to an embodiment of this application.
Figure 9B:
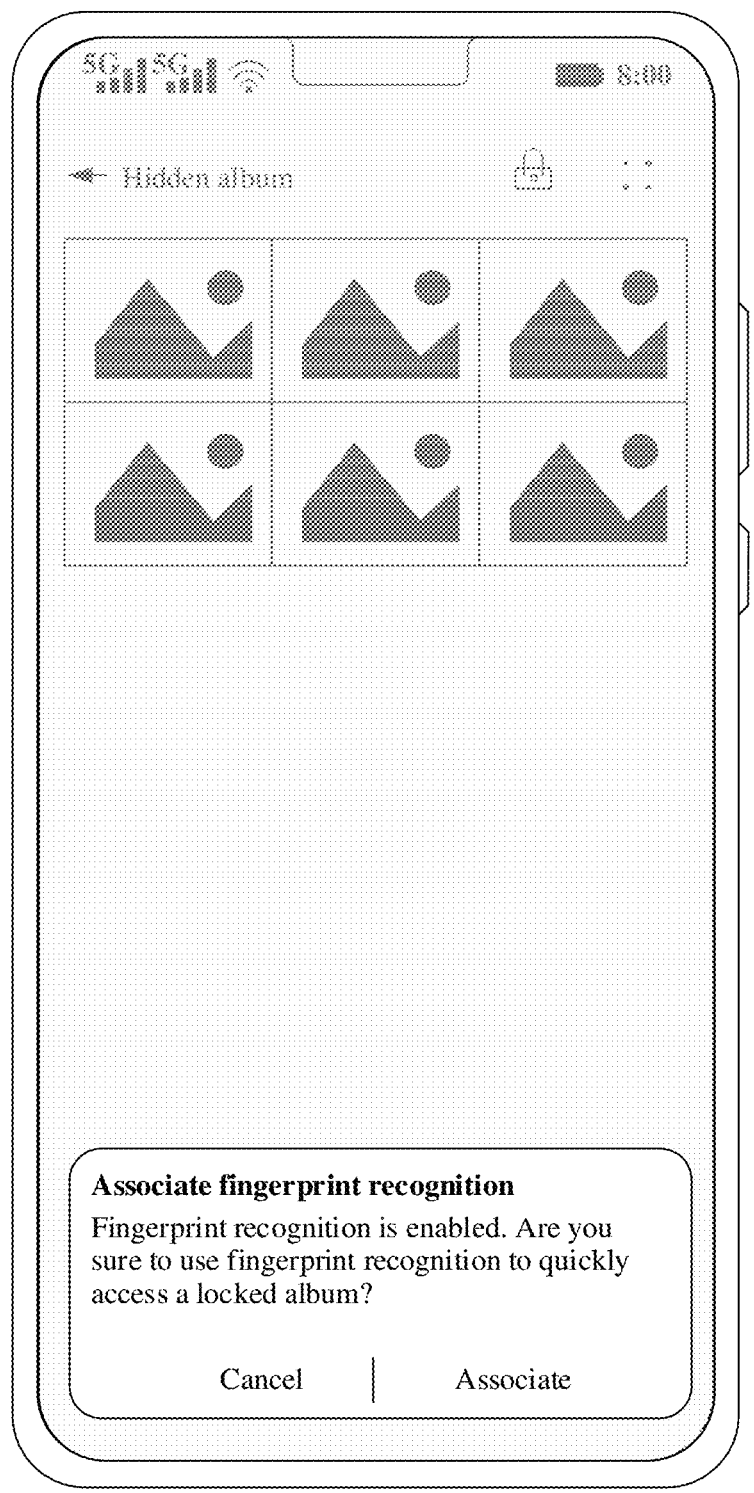

When the user adds the album lock, after the gallery detects that facial recognition or fingerprint recognition is set in a system, after the user adds the password lock, an active pop-up window is displayed to prompt that biometric recognition association can be performed. FIG. 9(a) and FIG. 9(b) are diagrams of interfaces of biometric recognition association according to an embodiment of this application. After biometric recognition association is performed, no additional active prompt is provided when the user opens the album subsequently.

After the gallery adds the lock to the album, an interface between the gallery and a system application corresponding to the album lock may be invoked, to transfer a picture in the locked album from an internal storage area corresponding to the gallery to an internal storage area corresponding to the system application, thereby meeting confidentiality and security requirements of the locked album.

The following describes three storage areas in which content may be placed by an application in an operating system. Refer to FIG. 1. Storage areas that may be used by the application in the operating system are divided as follows:
 external storage area: an external storage area and an external public directory of the application; and
 internal storage area: an internal storage area of the application.

Any application can access the external storage area, and the external storage area cannot meet security requirements. For the internal storage area, in the existing operating system, through file system-level permission control, only the application itself can access the internal storage area. However, according to a design of the operating system, when the user uninstalls the application, the system clears the internal storage area of the corresponding application.

In this embodiment of this application, an application (namely, an application corresponding to the album lock) is added to the operating system, and a permission of the application is set as a system application. In this case, the user cannot uninstall the application through an uninstallation entry of the operating system. In addition, the application is not updated in an application store, and the user cannot clear data in an internal storage area of the application by finding an uninstallation entry by uninstalling a newly installed application in the application store.

Figure 10:
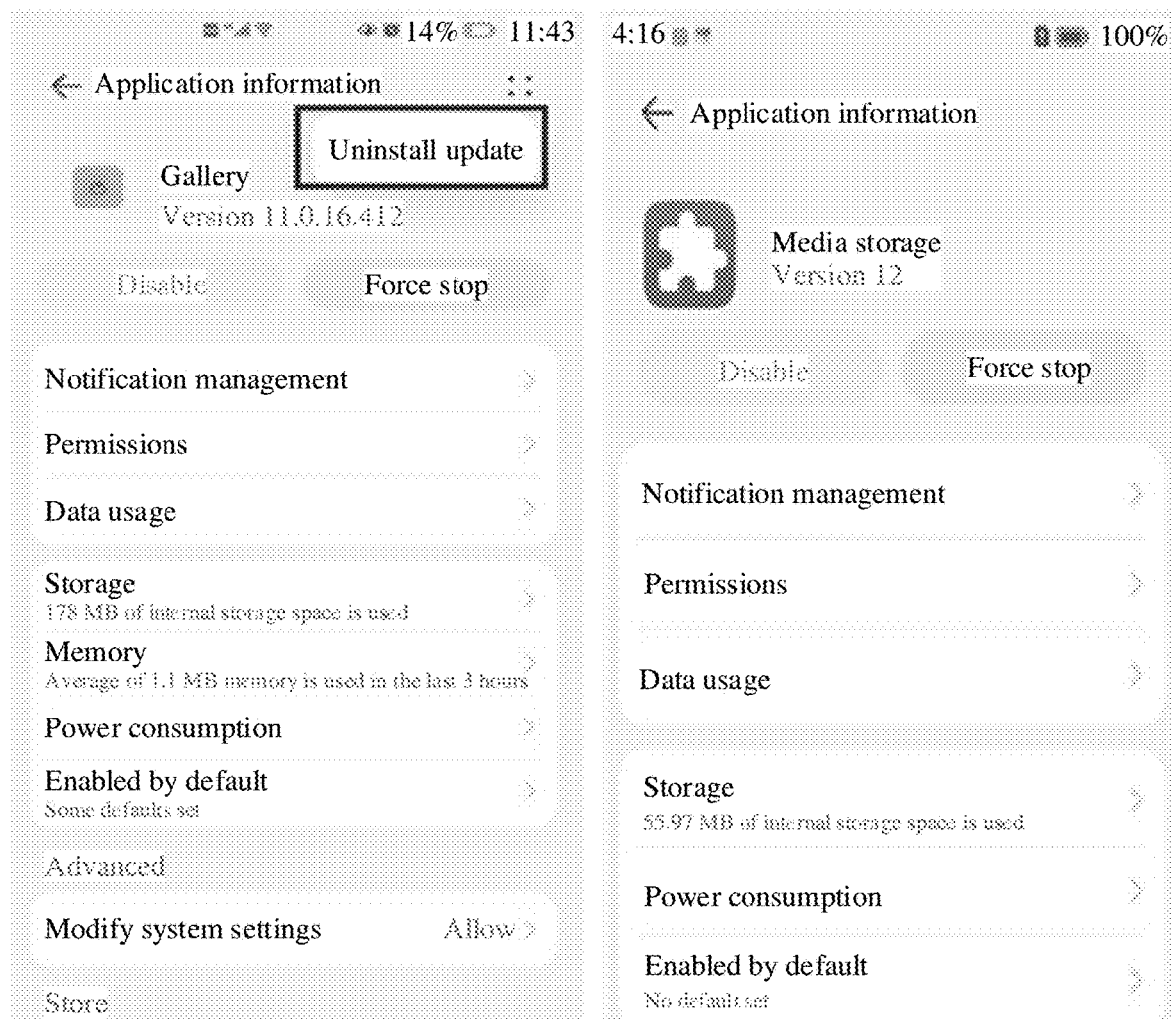
FIG. 10 is a diagram of comparison of hiding an uninstallation entry according to an embodiment of this application.

The following provides a comparison diagram. As shown in FIG. 10, it can be seen from FIG. 10 that the gallery is not a system application, and therefore there is an uninstallation entry in application management, while media storage is a system application, and therefore there is no uninstallation entry in the application management. In this case, the user cannot uninstall the system application, namely, the media storage, and cannot further clear an internal storage area corresponding to the media storage. FIG. 10 is a diagram of comparison of hiding an uninstallation entry according to an embodiment of this application.

In addition, in this embodiment of this application, an inter-process communication interface is added between the gallery and the added system application.

The following describes the picture storage method provided in embodiments of this application with reference to FIG. 6 to FIG. 10.

Figure 11:
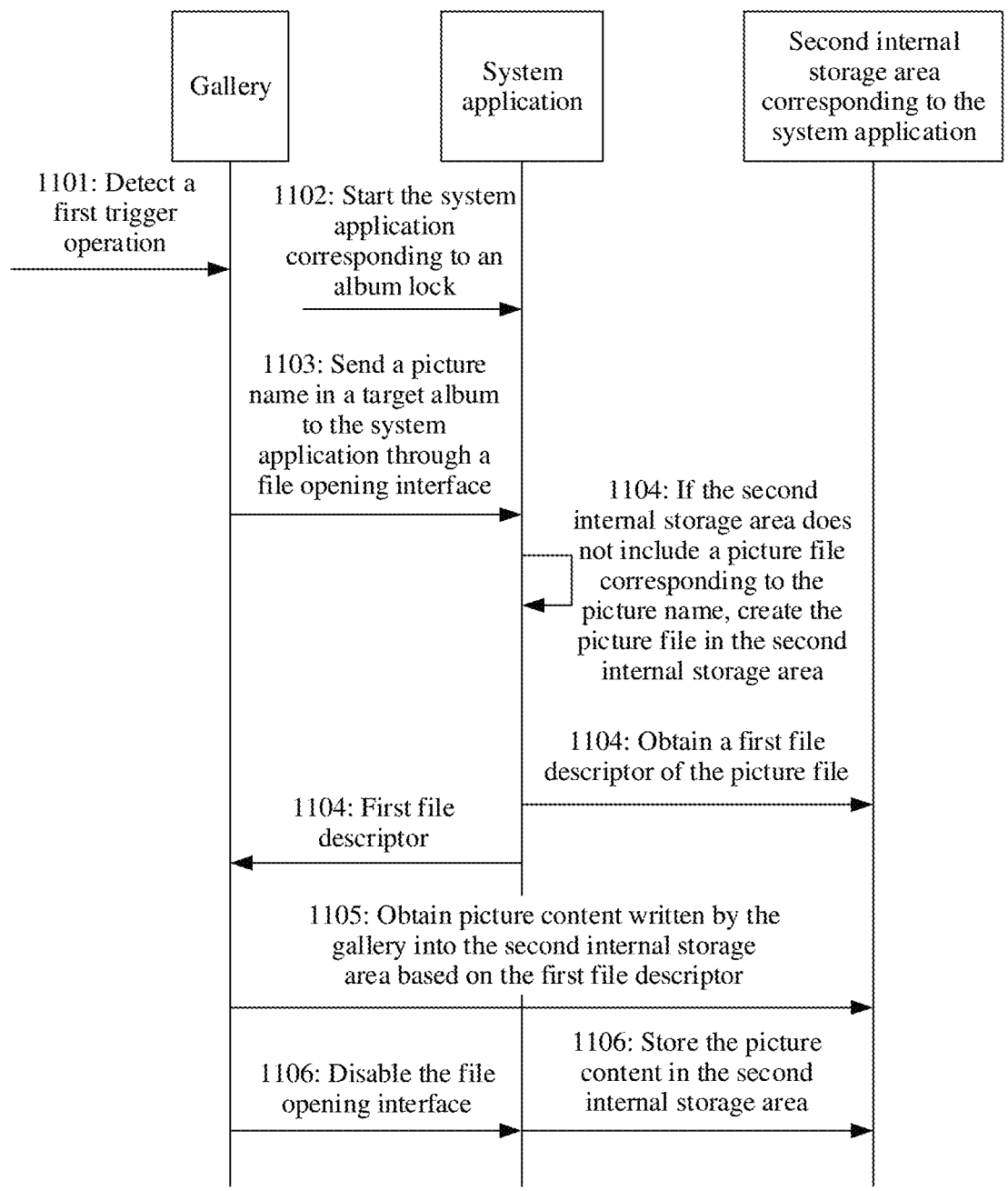
FIG. 11 is a flowchart of a picture storage method according to an embodiment of this application.

FIG. 11 is a flowchart of a picture storage method according to an embodiment of this application. As shown in FIG. 11, the picture storage method may include the following steps.

Step 1101: Detect a first trigger operation of adding an album lock to a target album by a user.

The target album is stored in a first internal storage area corresponding to a gallery.

Specifically, the first trigger operation may be an operation like tapping, touching and holding, or double-tapping on an "Add album lock" icon by the user. An operation form of the first trigger operation is not limited in this embodiment. For example, as shown in FIG. 6, when browsing the target album in the gallery, the user may add the album lock to the target album by tapping the "Add album lock" icon in a menu.

Step 1102: In response to the first trigger operation, add the album lock to the target album, and start a system application corresponding to the album lock.

Step 1103: Send a picture name in the target album to the system application through a file opening interface between the gallery and the system application.

Step 1104: If a second internal storage area corresponding to the system application does not include a picture file corresponding to the picture name, create the picture file in the second internal storage area, obtain a first file descriptor of the picture file, and return the first file descriptor of the picture file to the gallery.

Step 1105: Obtain picture content written by the gallery into the second internal storage area based on the first file descriptor.

Specifically, after obtaining the first file descriptor, the gallery may write the picture content into the second internal storage area based on the first file descriptor.

Step 1106: Disable the file opening interface, and store the picture content in the second internal storage area.

Specifically, each time a picture is written, the file opening interface needs to be disabled once, and then picture content is stored. Then, step 1103 to step 1106 may be performed again, to continue to store a picture.

In the foregoing picture storage method, when detecting the first trigger operation of adding the album lock to the target album by the user, in response to the first trigger operation, the terminal device 100 adds the album lock to the target album, starts the system application corresponding to the album lock, and then sends the picture name in the target album to the system application through the file opening interface between the gallery and the system application. If the second internal storage area corresponding to the system application does not include the picture file corresponding to the picture name, the terminal device creates the picture file in the second internal storage area, obtains the first file descriptor of the picture file, and returns the first file descriptor of the picture file to the gallery. Finally, the terminal device obtains the picture content written by the gallery into the second internal storage area based on the first file descriptor, disables the file opening interface, and stores the picture content in the second internal storage area. In this way, the terminal device 100 can store a picture in a locked manner without encryption, decryption, or additional calculation. In addition, even if the user clears data of the gallery, only the first internal storage area corresponding to the gallery is cleared. Because the picture content is also stored in the second internal storage area corresponding to the system application, the terminal device 100 still retains the picture in the locked manner.

In the terminal device 100, the operating system provides a storage area clearing operation entry for each application, and the user clears, through the operation entry, all data stored in an external storage area and an internal storage area of the application. In this embodiment of this application, a storage area clearing entry of the system application corresponding to the album lock is in a user-invisible state. Specifically, the system application corresponding to the album lock may prevent, in two manners, the user from clearing data in the storage area of the system application, to ensure data security of the locked album.

Figure 12:
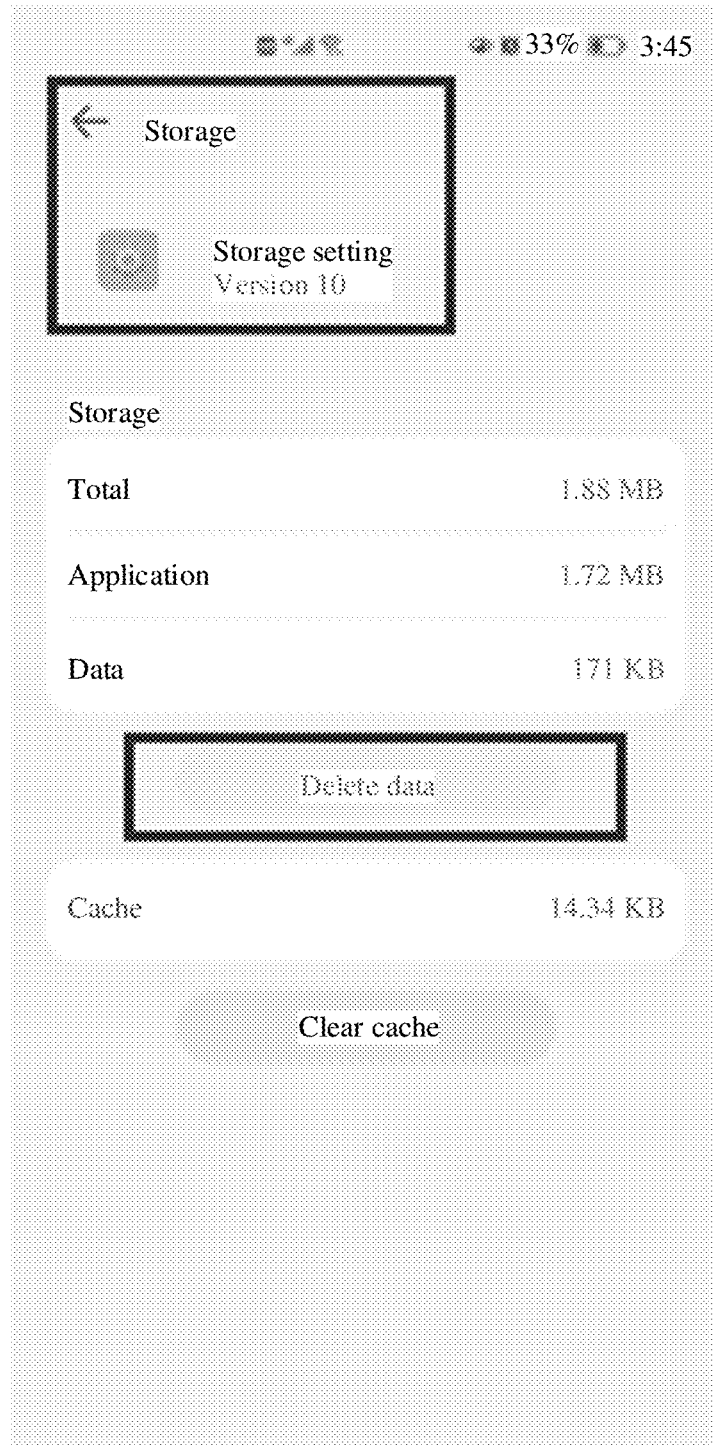
FIG. 12 is a diagram of an interface in which a storage area clearing operation entry is hidden according to an embodiment of this application.

Manner 1: The system application may apply for a system permission to hide the storage area clearing operation entry, like a settings application in the system, and the user cannot tap the operation entry. FIG. 12 is a diagram of an interface in which a storage area clearing operation entry is hidden according to an embodiment of this application. It can be learned from FIG. 12 that a storage area clearing operation entry of the settings application is hidden, and the user cannot tap the operation entry. In this case, the system application of the album lock may hide the storage area clearing operation entry in a same manner used for the settings application.

Figure 13:
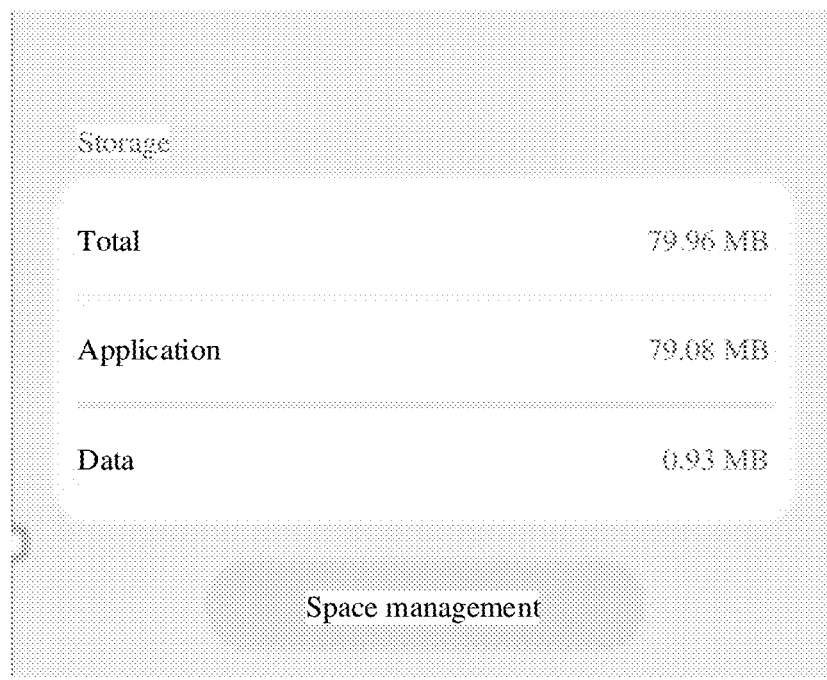
FIG. 13 is a diagram of changing a data deletion entry into a prompt interface according to an embodiment of this application.

Manner 2: The system application may change a data deletion entry into a prompt interface through a configuration entry provided by the system. As shown in FIG. 13, the original "Delete data" text of the system may be replaced with "Manage space", or another prompt text may be used. If the user taps the button, a pop-up window may be displayed, to indicate, to the user, that the data cannot be deleted. FIG. 13 is a diagram of changing the data deletion entry into the prompt interface according to an embodiment of this application.

Figure 14:
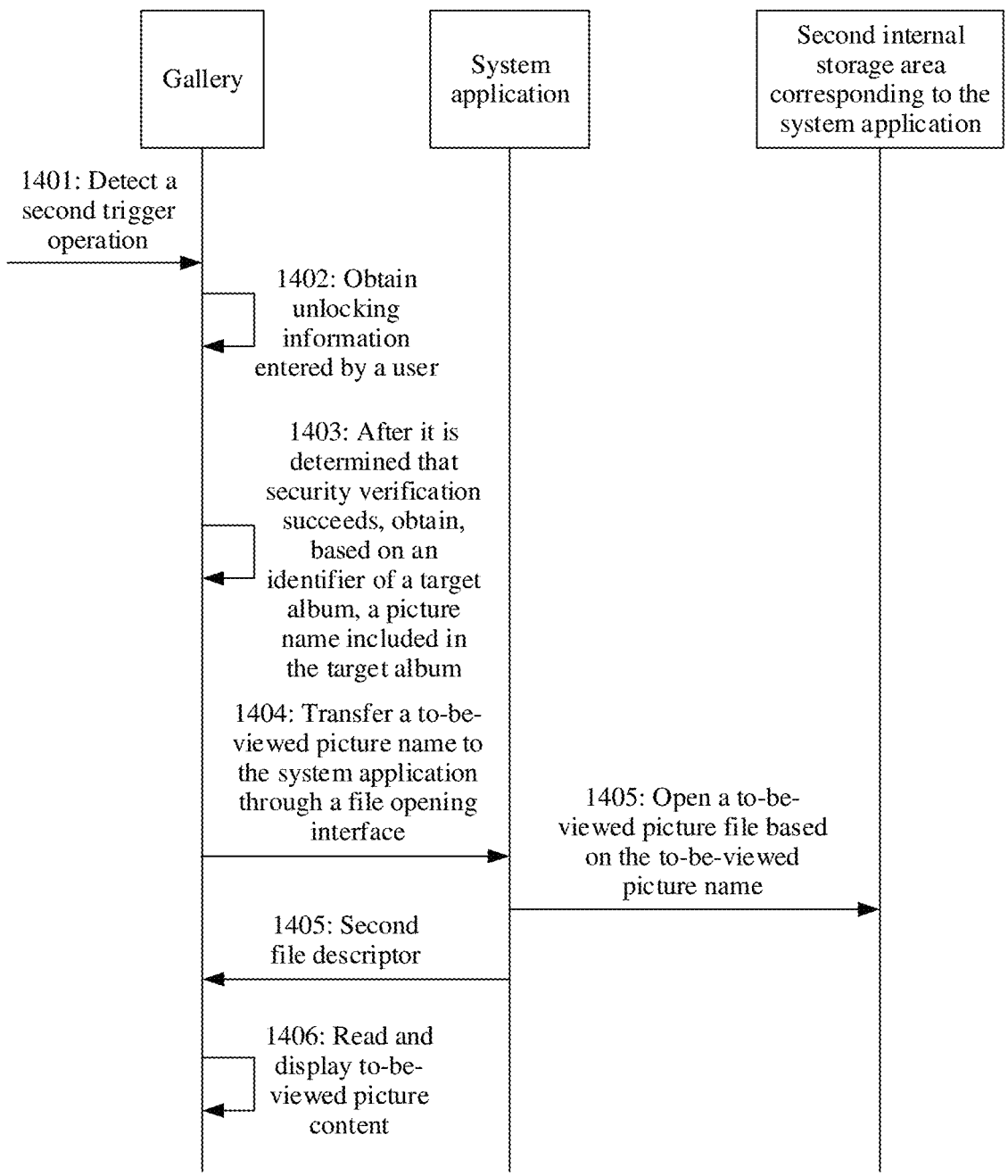
FIG. 14 is a flowchart of a picture storage method according to another embodiment of this application.

FIG. 14 is a flowchart of a picture storage method according to another embodiment of this application. As shown in FIG. 14, in the embodiment shown in FIG. 11 in this application, after step 1106, the method may further include the following steps.

Step 1401: Detect a second trigger operation of unlocking the target album by the user.

Step 1402: In response to the second trigger operation, obtain unlocking information entered by the user.

The unlocking information may be the password set by the user when the user adds the album lock to the target album, or may be about biometric recognition, for example, facial recognition or fingerprint recognition, associated when the user adds the album lock to the target album. A specific form of the unlocking information is not limited in this embodiment.

Figure 15A:
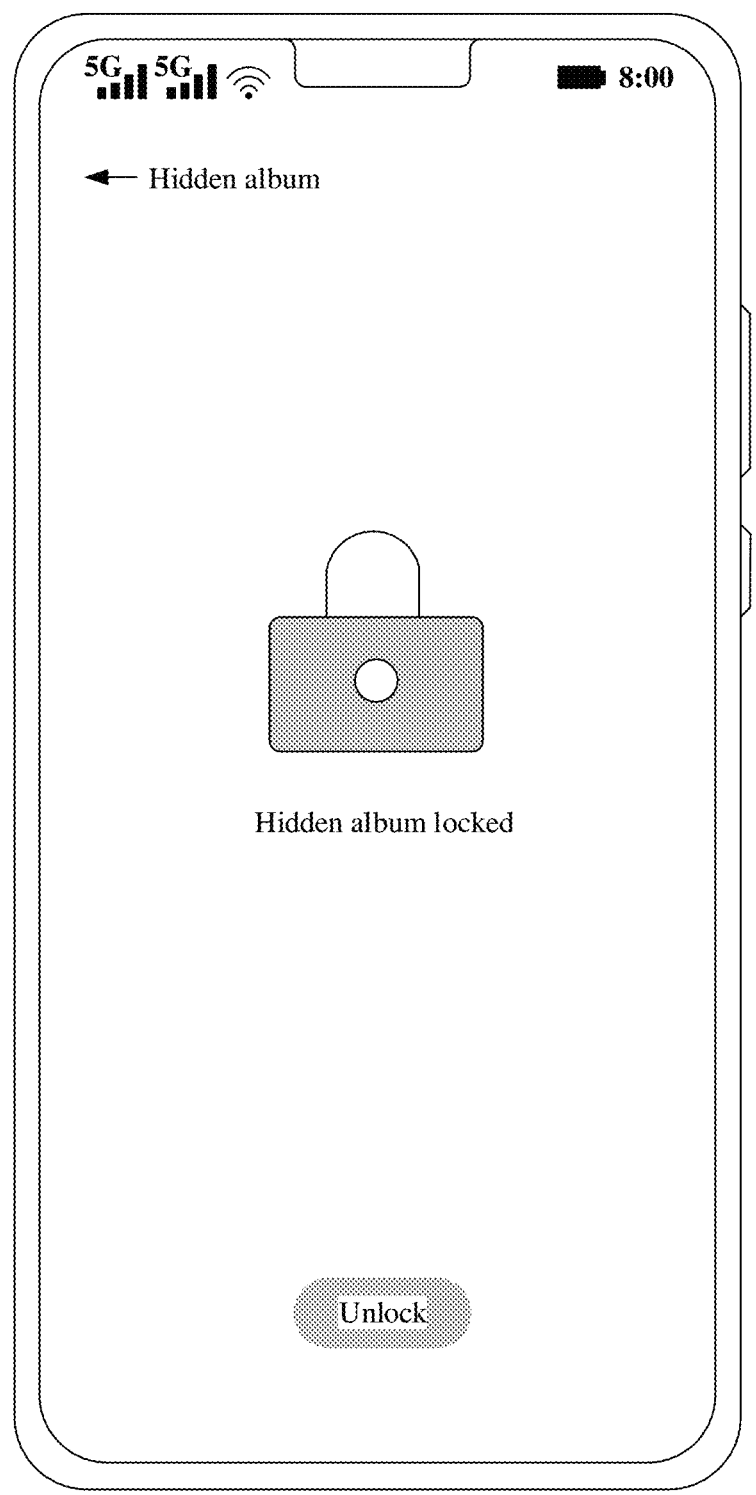
FIG. 15(a) and FIG. 15(b) are diagrams of interfaces for unlocking a target album according to an embodiment of this application.
Figure 15B:
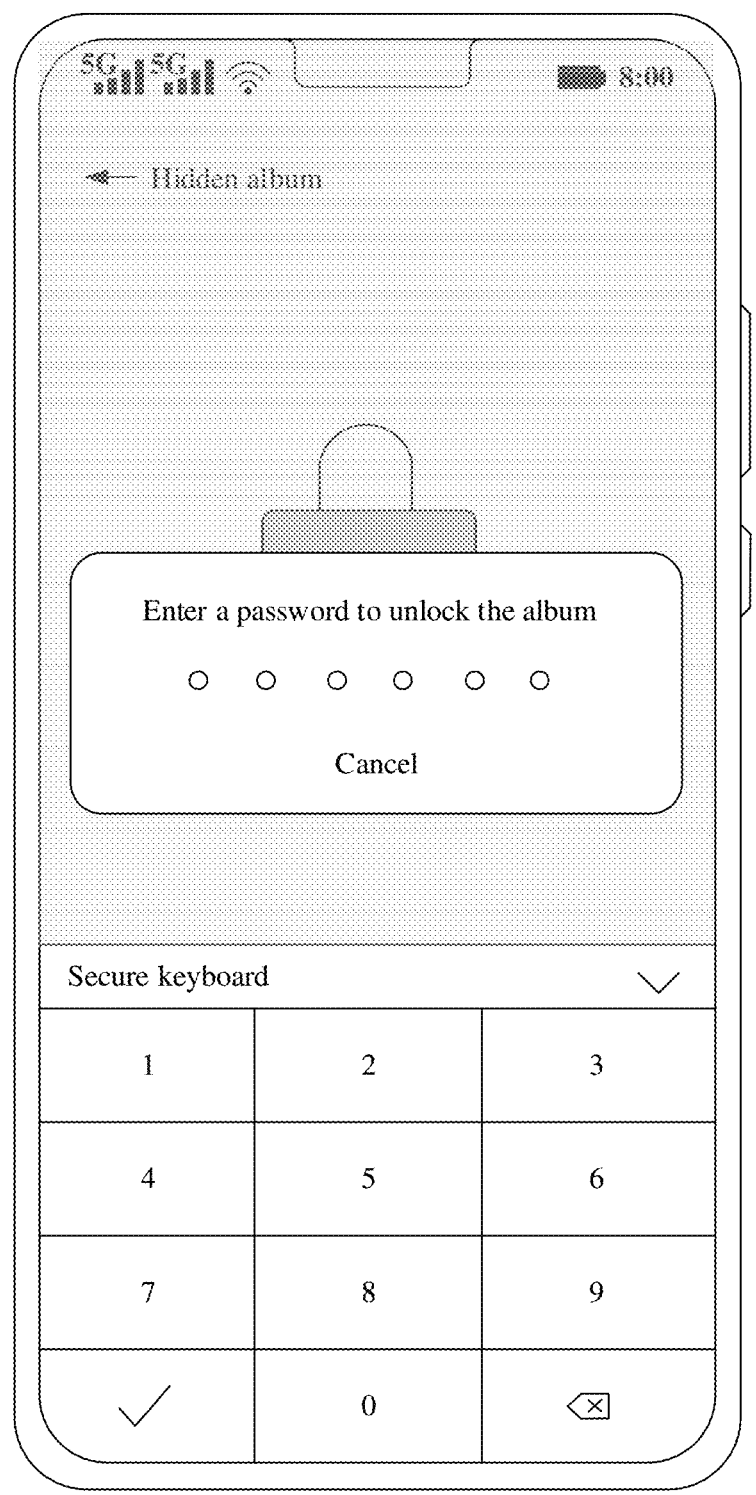

Specifically, for example, the target album is a hidden album. When the user accesses the locked target album, the terminal device 100 first displays an interface shown in FIG. 15(a), and prompt information "The hidden album is locked" is displayed in the interface shown in FIG. 15(a). In this case, the user may tap an "Unlock" icon in the interface shown in FIG. 15(a). An operation of tapping the "Unlock" icon by the user is the second trigger operation. After detecting the second trigger operation of unlocking the target album by the user, the terminal device 100 may display an interface shown in FIG. 15(b), and then the user may enter the unlocking information in the interface shown in FIG. 15(b). The terminal device 100 obtains the unlocking information entered by the user. In FIG. 15(b), the unlocking information is the password. FIG. 15(a) and FIG. 15(b) are diagrams of interfaces for unlocking the target album according to an embodiment of this application.

Step 1403: After it is determined that security verification on the unlocking information succeeds, obtain, based on an identifier of the target album, the picture name included in the target album.

Step 1404: Transfer the to-be-viewed picture name to the system application through the file opening interface.

Step 1405: After the system application opens a to-be-viewed picture file based on the to-be-viewed picture name, obtain a second file descriptor that is of the to-be-viewed picture file and that is returned by the system application.

Specifically, after receiving the to-be-viewed picture name, the system application may find the corresponding picture file based on the to-be-viewed picture name, open the to-be-viewed picture file, and return the second file descriptor of the to-be-viewed picture file to the gallery.

Step 1406: Read and display to-be-viewed picture content based on the second file descriptor by using the gallery.

Specifically, after obtaining the second file descriptor, the gallery may read and display the picture content based on the second file descriptor, and display the picture content.

Modification on the picture in the target album may be classified into the following two types:
 (1) modification on the picture content, for example, entering an editing mode for doodling on or watermarking the picture; and
 (2) modification on picture file information, for example, changing a file name.

Figure 16:
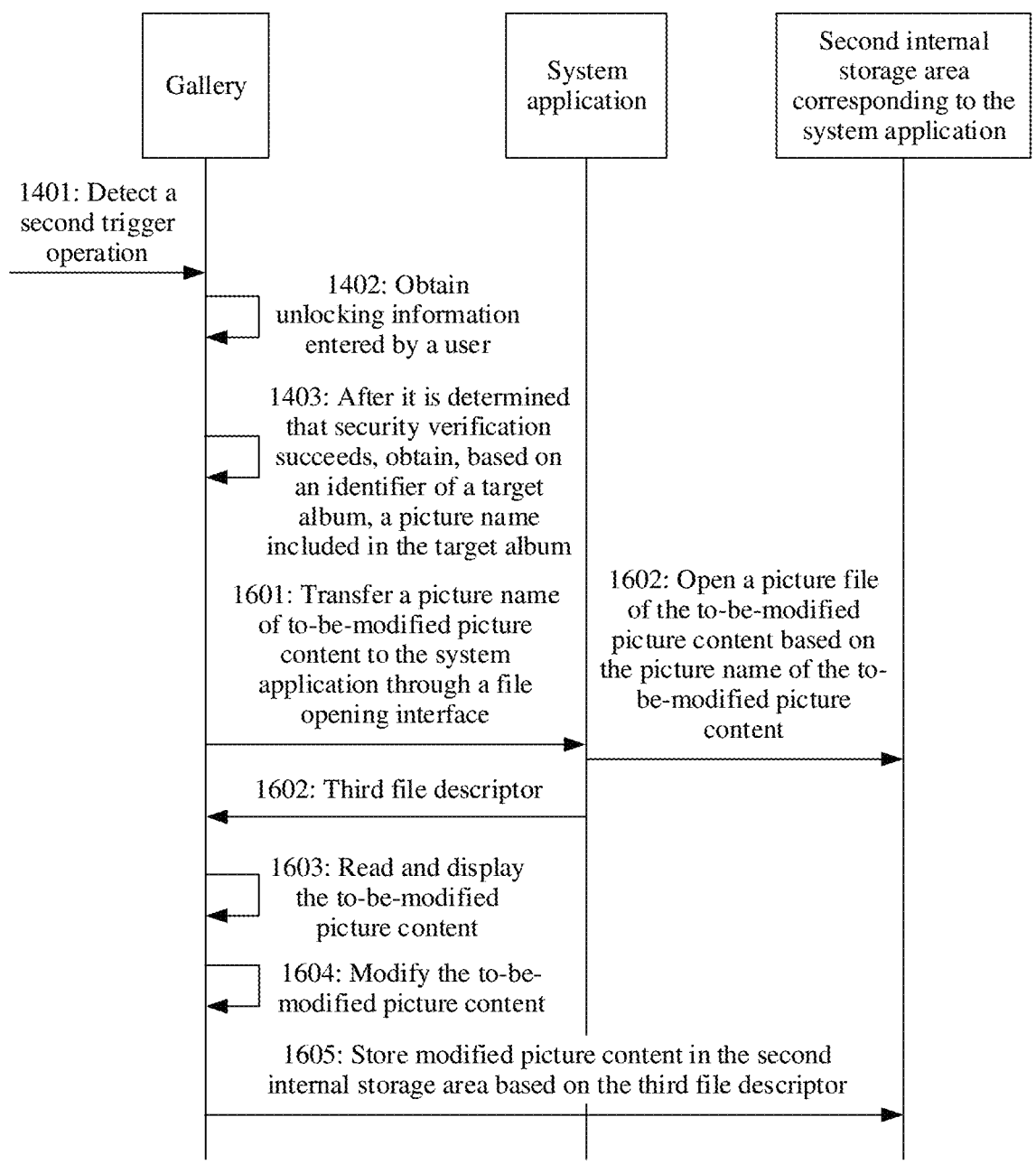
FIG. 16 is a flowchart of a picture storage method according to still another embodiment of this application.

Modification on the picture content is the same as access to the picture, that is, the gallery modifies the picture content of the system application based on the received second file descriptor. FIG. 16 is a flowchart of a picture storage method according to still another embodiment of this application. In the embodiment shown in FIG. 14 in this application, after step 1403, the method may further include the following steps.

Step 1601: Transfer the picture name of the to-be-modified picture content to the system application through the file opening interface.

Step 1602: After the system application opens a picture file of the to-be-modified picture content based on the picture name of the to-be-modified picture content, obtain a third file descriptor that is of the picture file of the to-be-modified picture content and that is returned by the system application.

Step 1603: Read and display the to-be-modified picture content based on the third file descriptor by using the gallery.

Step 1604: Modify the to-be-modified picture content by using the gallery.

Step 1605: Store modified picture content in the second internal storage area based on the third file descriptor by using the gallery.

Figure 17:
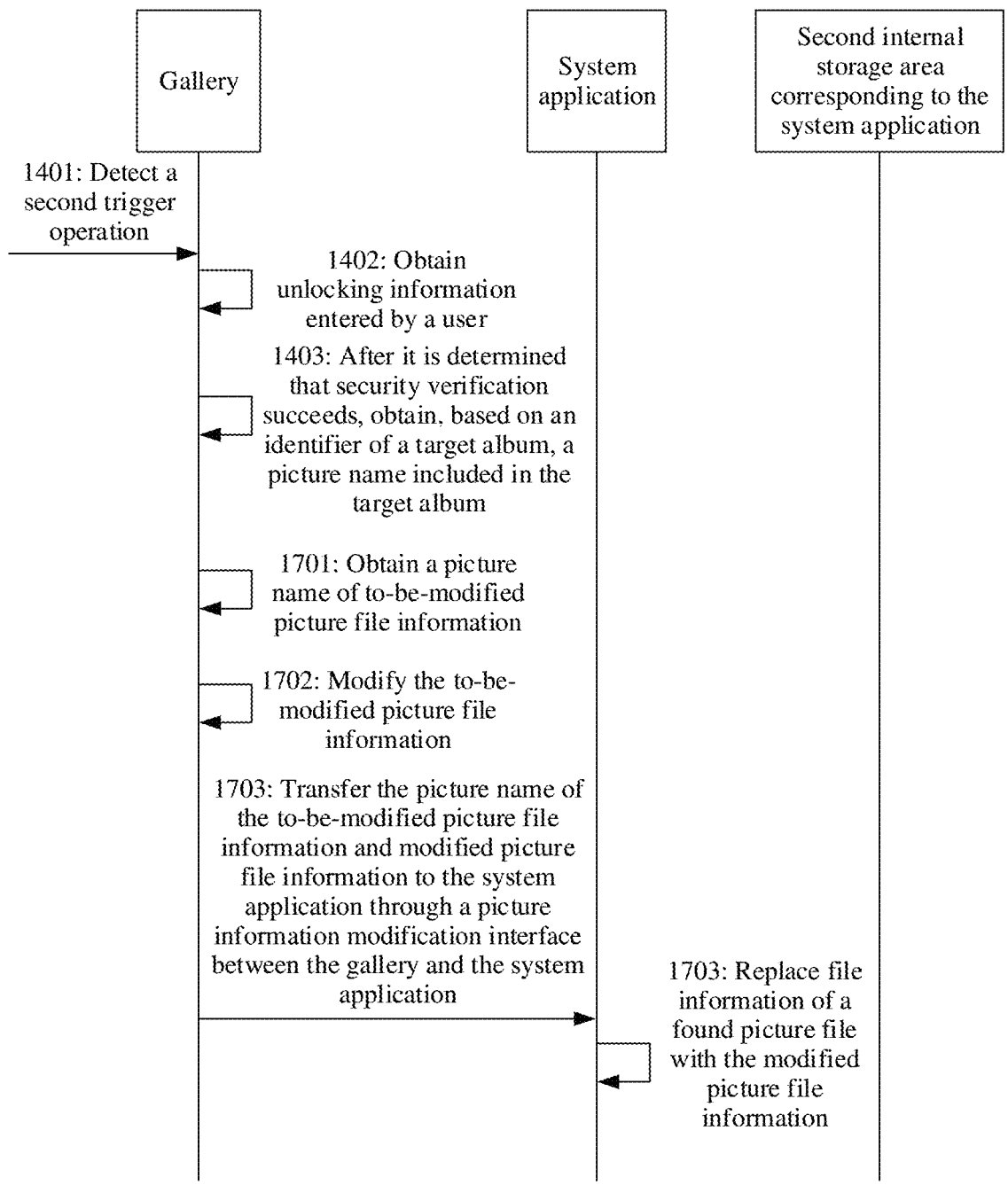
FIG. 17 is a flowchart of a picture storage method according to yet another embodiment of this application.

Modification on picture information, for example, changing a file name, does not require an operation using the file descriptor. An inter-process communication interface may be added on a system application side corresponding to the album lock, and is used to modify the picture file information. The gallery invokes the interface to send modified picture information to the system application side, and the system application finds a picture based on a picture name, replaces information, and completes modification on the file information. FIG. 17 is a flowchart of a picture storage method according to yet another embodiment of this application. In the embodiment shown in FIG. 14 in this application, after step 1403, the method may further include the following steps.

Step 1701: Obtain a picture name of to-be-modified picture file information by using the gallery.

Step 1702: Modify the to-be-modified picture file information by using the gallery.

Step 1703: Transfer the picture name of the to-be-modified picture file information and modified picture file information to the system application through a picture information modification interface between the gallery and the system application, so that after finding a picture file corresponding to the picture name of the to-be-modified picture file information, the system application replaces file information of the found picture file with the modified picture file information.

Figure 18:
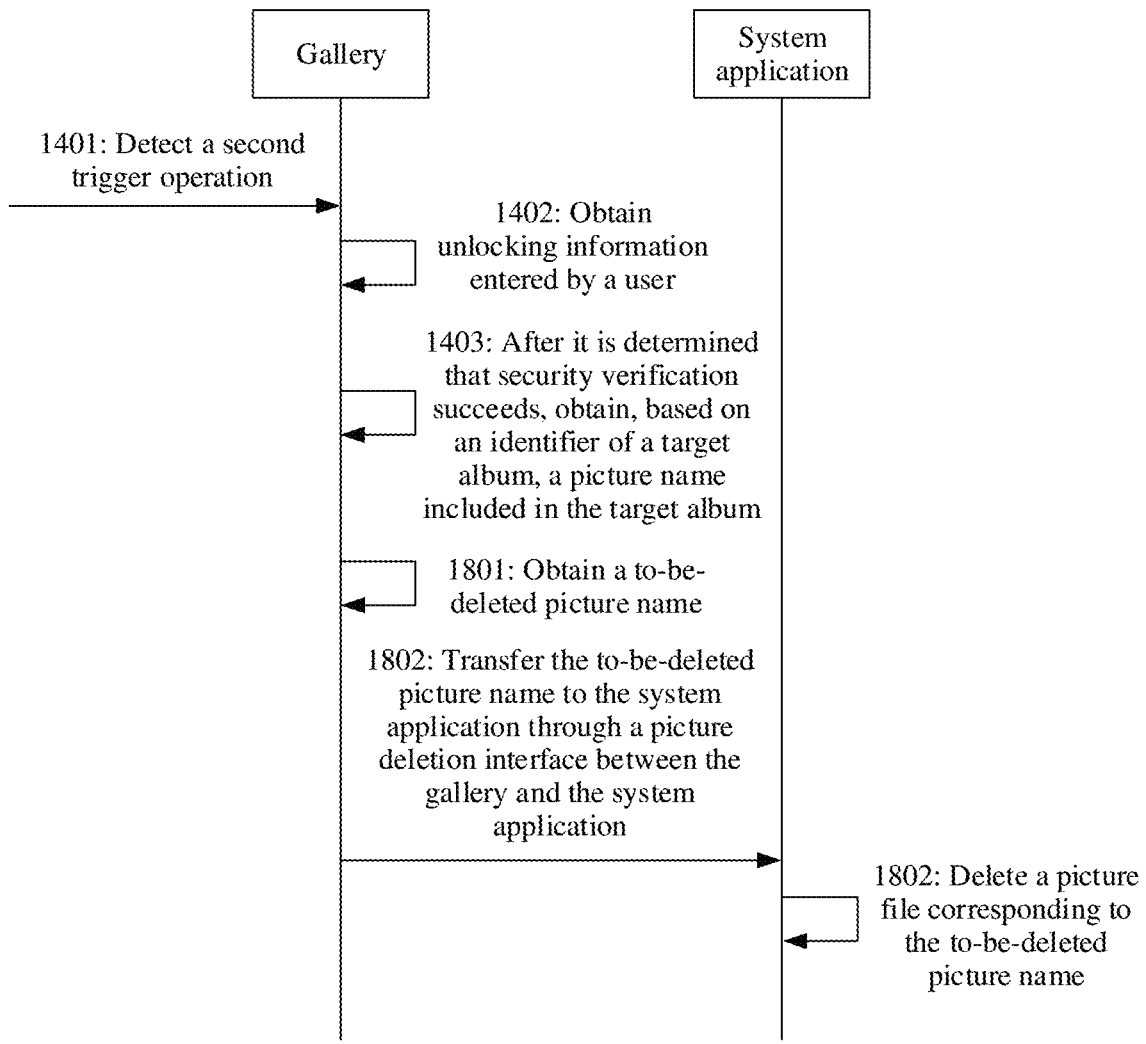
FIG. 18 is a flowchart of a picture storage method according to a further embodiment of this application.

In this embodiment of this application, the user may delete the picture in the locked album in an album browsing interface. The terminal device 100 provides a multi-selection interaction interface in the album browsing interface of the gallery. The user may select a picture in the multi-selection interaction interface, and then tap Delete and OK, to trigger a deletion behavior. The system application provides a deletion interface. The gallery invokes the interface to send, to the system application, a name of the picture that the user selects to delete. The system application directly deletes a picture file based on the picture name. FIG. 18 is a flowchart of a picture storage method according to a further embodiment of this application. In the embodiment shown in FIG. 14 in this application, after step 1403, the method may further include the following steps.

Step 1801: Obtain a to-be-deleted picture name by using the gallery.

Step 1802: Transfer the to-be-deleted picture name to the system application through a picture deletion interface between the gallery and the system application, so that the system application deletes a picture file corresponding to the to-be-deleted picture name.

Figure 19:
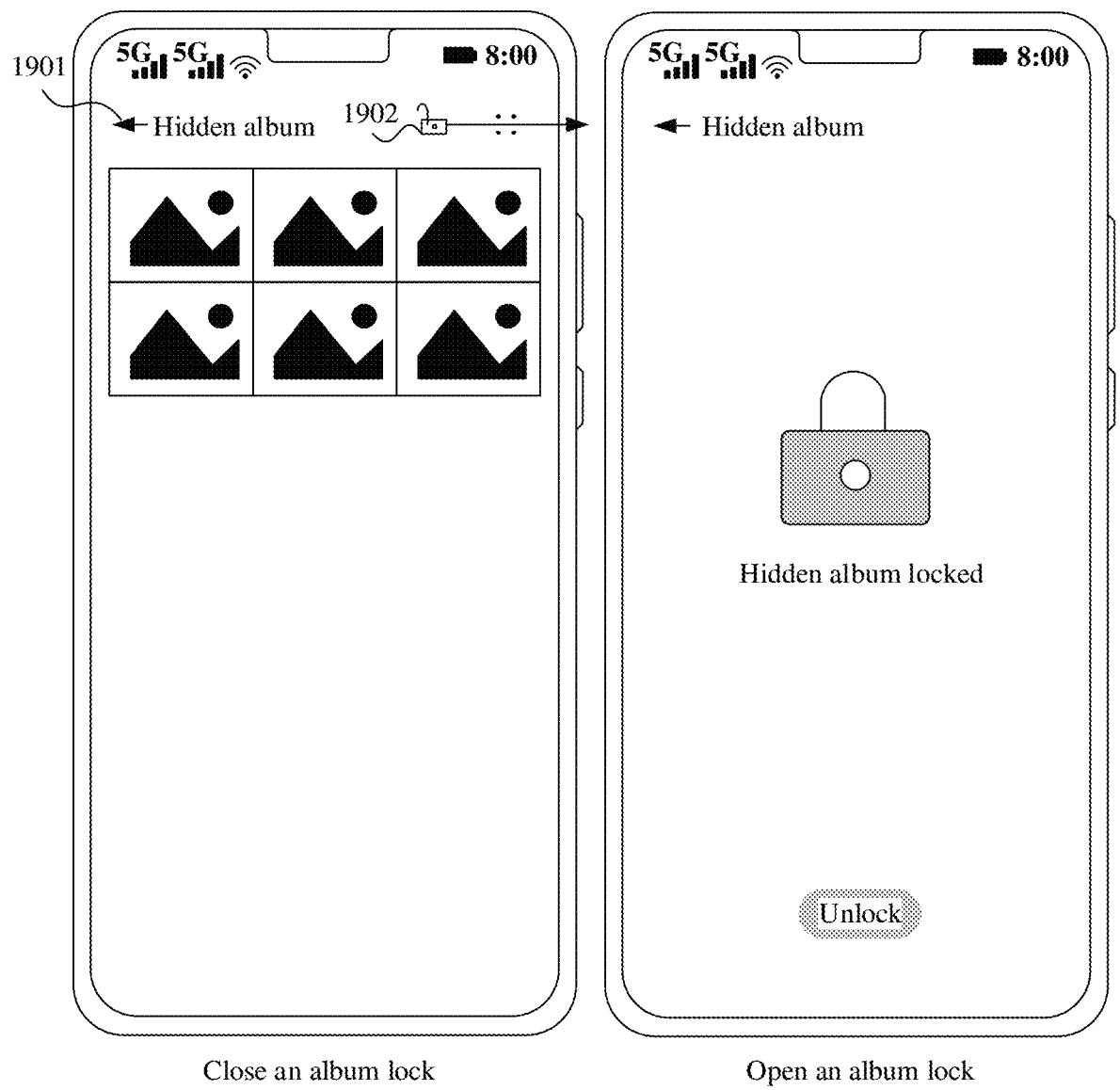
FIG. 19 is a diagram of an interface for opening and closing an album lock according to an embodiment of this application.

In this embodiment of this application, as shown in FIG. 19, after accessing the locked album and completing operations such as browsing, picture storage, and/or picture modification, the user may tap a Return button 1901 to leave the locked album. Alternatively, the user may tap a locking button 1902 to return to a locking interface. FIG. 19 is a diagram of an interface for opening and closing the album lock according to an embodiment of this application.

Figure 20A:
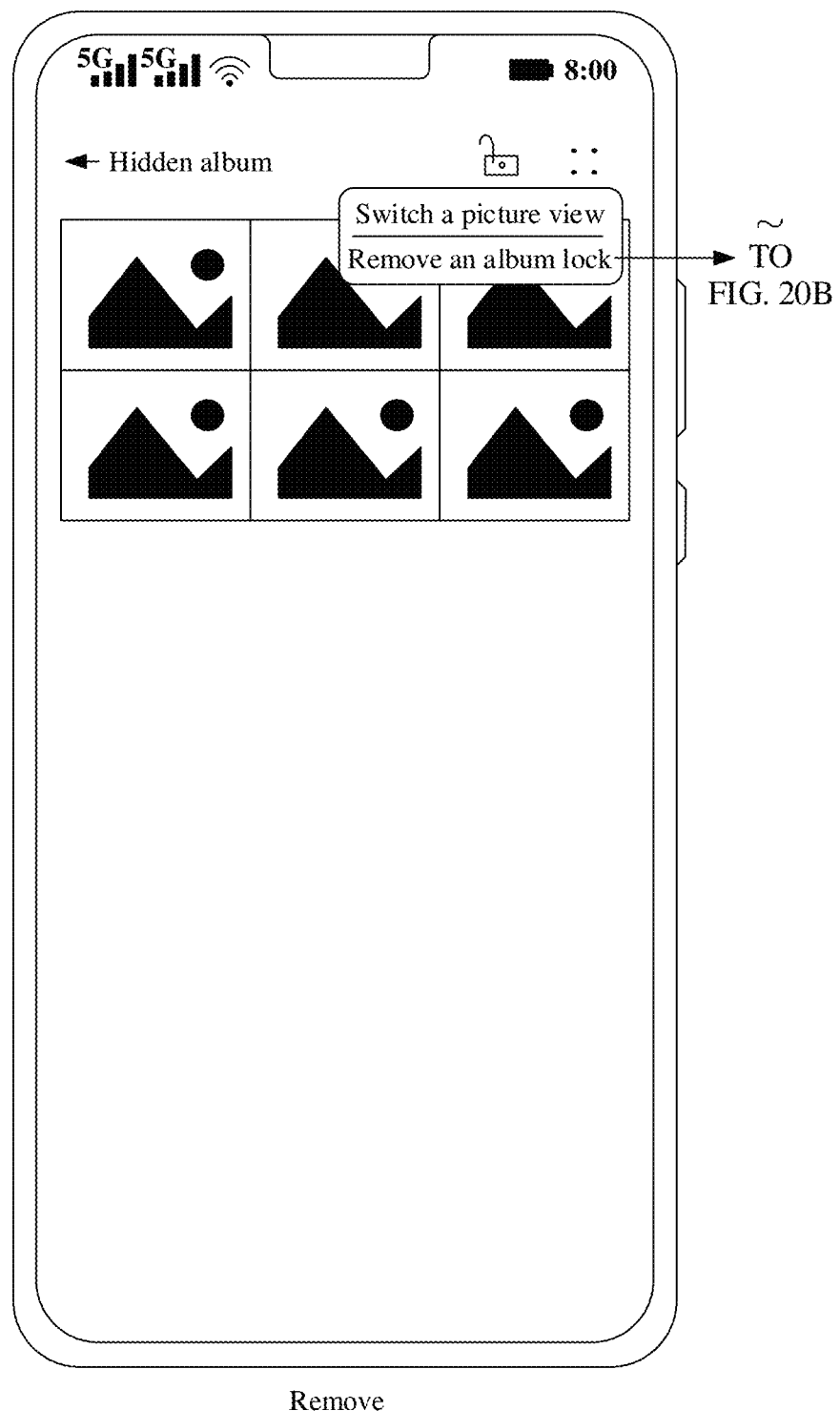
FIG. 20A to FIG. 20C are a diagram of an interface for removing an album lock according to an embodiment of this application.
Figure 20B:
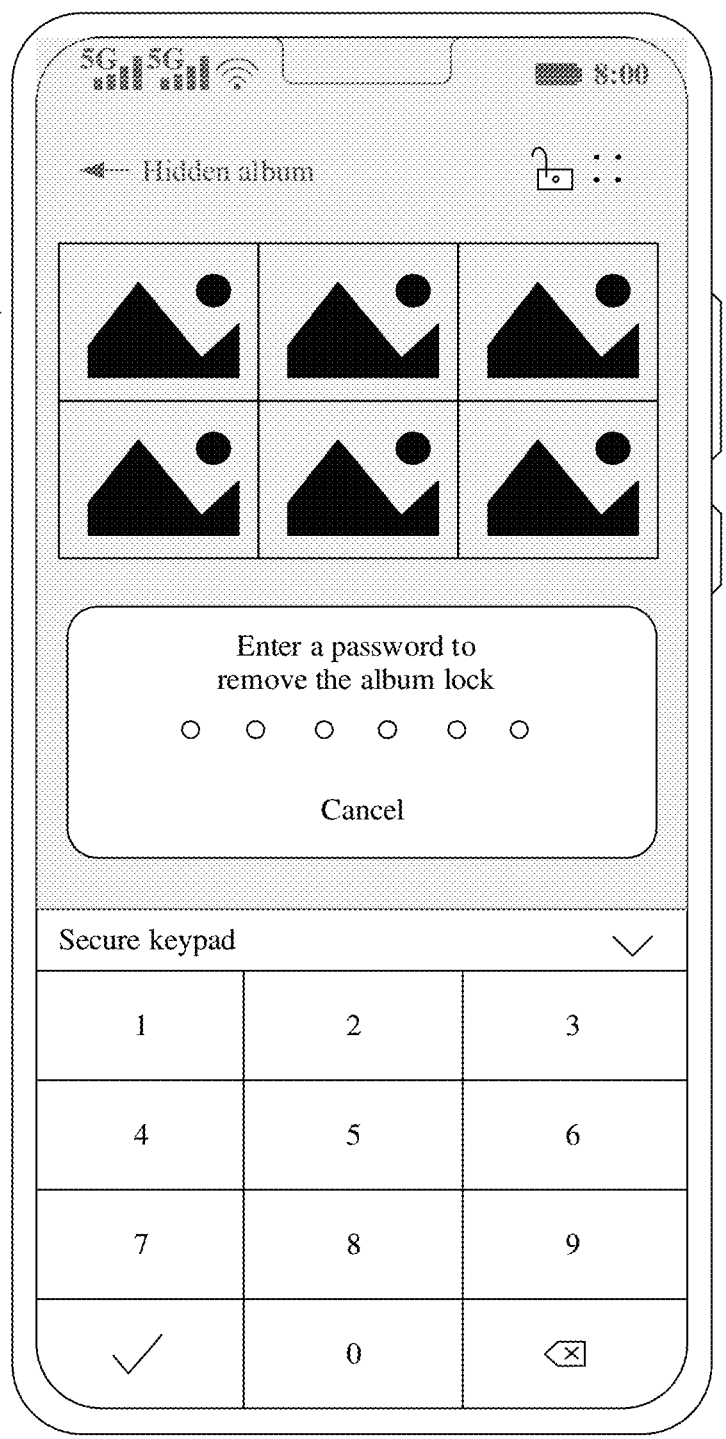
Figure 20C:
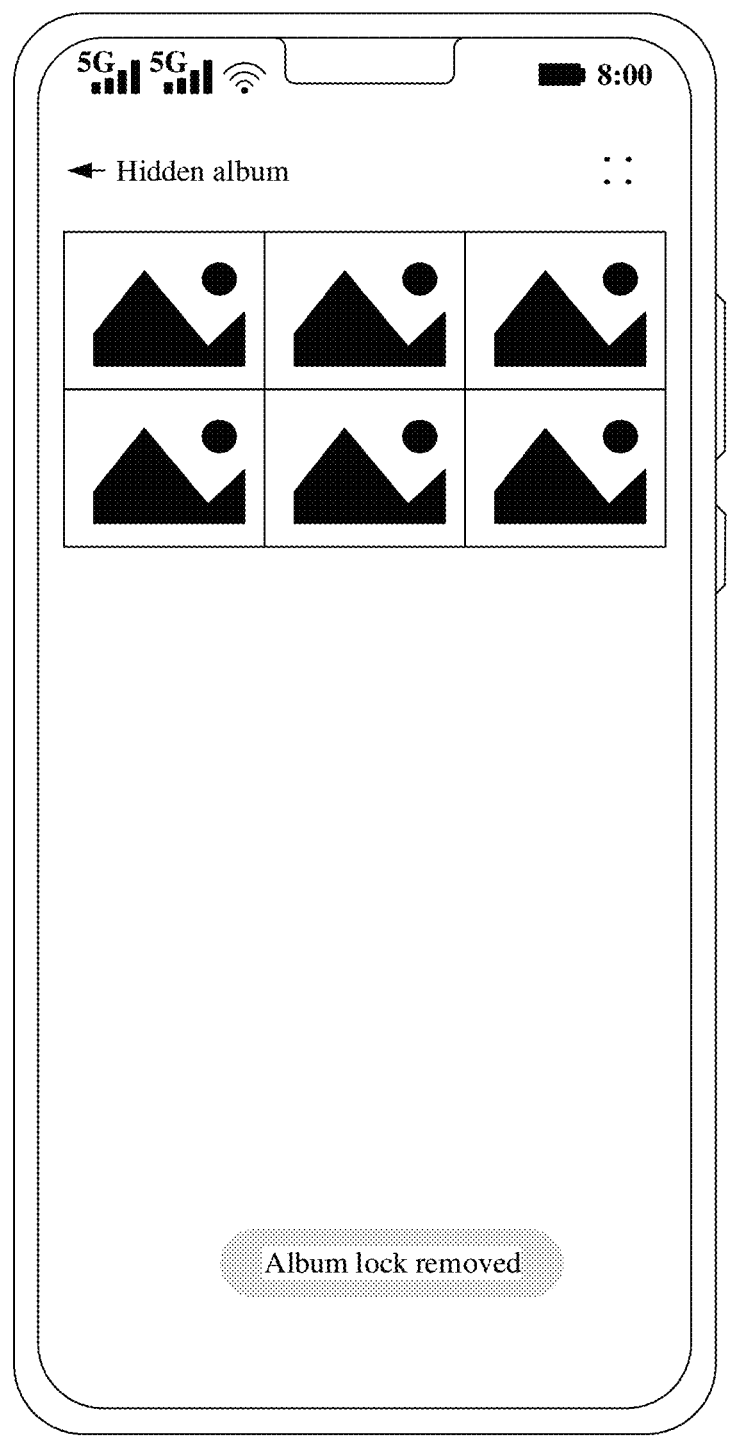

In this embodiment of this application, after the locked album is opened, the user may remove the album lock, and restore the album to a common album. A small pop-up window is displayed for a prompt when the album lock is removed. After the album lock is removed, all lock-related menus in a navigation bar disappear. To be specific, as shown in FIG. 20A to FIG. 20C, in the embodiment shown in FIG. 11 in this application, after step 1102, after detecting a third trigger operation of removing the album lock of the target album by the user, the terminal device 100 may further obtain, in response to the third trigger operation, the unlocking information entered by the user; and after it is determined that security verification on the unlocking information succeeds, remove the album lock for the target album. FIG. 20A to FIG. 20C are a diagram of an interface for removing the album lock according to an embodiment of this application.

In this embodiment of this application, a locking menu is provided in an album interface of the gallery. After the user taps the locking menu, the terminal device 100 performs a locking operation on a current album.

First, the user is prompted to enter a password, and input verification is completed twice. In addition, the user may be prompted, based on a hardware status of the terminal device 100, to associate fingerprint recognition or facial recognition.

Then, the gallery transfers a picture in the current album to an internal storage area of the system application corresponding to the album lock. The system application cannot be uninstalled, and therefore the user cannot clear data in the internal storage area of the system application by using an uninstallation button. In addition, the system application hides a storage area clearing entry of the system, and therefore the user cannot clear the data of the system application by tapping "Clear storage area".

By using the foregoing operations, the terminal device 100 can transfer the picture in the locked album to a secure location by using the gallery. The user can access, modify, and/or delete the picture in the locked album by using only an entry of the locked album in the gallery.

In addition, in the picture storage method provided in embodiments of this application, any album can be locked. In addition, no encryption or decryption algorithm is used in embodiments of this application, and the picture does not need to be encrypted or decrypted to ensure picture information security. In this way, the device does not need to perform a large amount of calculation to encrypt and decrypt the picture. This reduces overheads of the terminal device 100 and also reduces time required for the user to access the picture. For the picture, there is no need to worry about information leakage caused by cracking of an encryption or decryption algorithm, nor about an information loss caused because the user can delete the picture even if the user cannot view the picture.

In addition, in embodiments of this application, the user cannot clear data through update uninstallation, and an entry for the user to directly clear the storage area is further hidden, to ensure that the user can access the picture by using only the entry of the locked album.

In addition, the method provided in embodiments of this application may alternatively be applied to any other application. In addition to being used to store the locked album, the method may be further used to store data of a safe or store privacy data of any application.

It can be understood that some or all of the steps or operations in the foregoing embodiments are merely examples, and other operations or variants of various operations may be further performed in embodiments of this application. In addition, the steps may be performed in another order different from that presented in the foregoing embodiments, and not all the operations in the foregoing embodiments may be performed.

It may be understood that, to implement the foregoing functions, the terminal device includes corresponding hardware and/or software modules for performing the functions. Algorithm steps in the examples described with reference to embodiments disclosed in this application can be implemented by hardware or a combination of hardware and computer software in this application. Whether a function is performed by hardware or hardware driven by computer software depends on a particular application and a design constraint of the technical solutions. A person skilled in the art may use different methods to implement the described functions for each particular application with reference to embodiments, but it should not be considered that the implementation goes beyond the scope of this application.

In this embodiment, the terminal device may be divided into function modules based on the foregoing method embodiments, for example, each function module may be obtained through division based on each corresponding function, or two or more functions may be integrated into one module. The integrated module may be implemented in a form of hardware. It should be noted that module division in this embodiment is an example and is merely logical function division. In practice, there may be another division manner.

Figure 21:
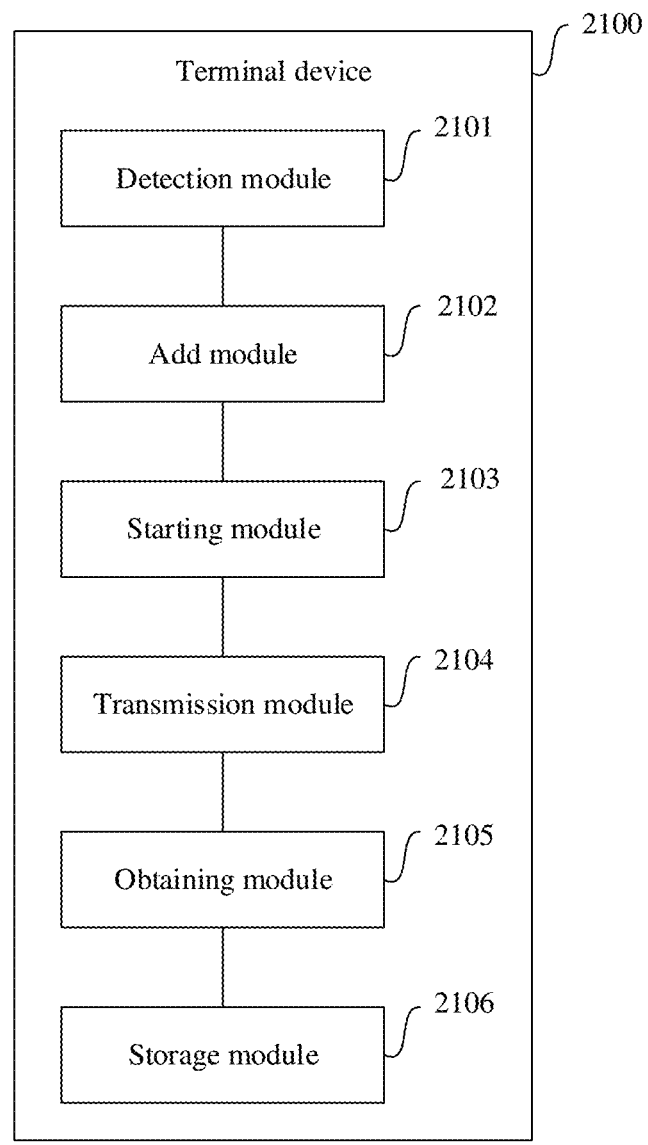
FIG. 21 is a diagram of a structure of a terminal device according to another embodiment of this application.

FIG. 21 is a diagram of a structure of a terminal device according to another embodiment of this application. When each function module is obtained through division based on each corresponding function, FIG. 21 is a diagram of a possible composition of the terminal device 2100 in the foregoing embodiment. As shown in FIG. 21, the terminal device 2100 may include a detection module 2101, an add module 2102, a starting module 2103, a transmission module 2104, an obtaining module 2105, and a storage module 2106.

The detection module 2101 is configured to detect a first trigger operation of adding an album lock to a target album by a user, where the target album is stored in a first internal storage area corresponding to a gallery.

The add module 2102 is configured to: in response to the first trigger operation, add the album lock to the target album.

The starting module 2103 is configured to start a system application corresponding to the album lock.

The transmission module 2104 is configured to send a picture name in the target album to the system application through a file opening interface between the gallery and the system application.

The obtaining module 2105 is configured to: if a second internal storage area corresponding to the system application does not include a picture file corresponding to the picture name, create the picture file in the second internal storage area, and obtain a first file descriptor of the picture file.

The transmission module 2104 is further configured to return the first file descriptor of the picture file to the gallery.

The obtaining module 2105 is further configured to obtain picture content written by the gallery into the second internal storage area based on the first file descriptor.

The storage module 2106 is configured to: disable the file opening interface, and store the picture content in the second internal storage area.

It should be noted that all related content of the steps in the method embodiment shown in FIG. 11 in this application may be cited in function description of corresponding function modules. Details are not described herein again.

The terminal device 2100 provided in this embodiment is configured to perform the picture storage method provided in the embodiment shown in FIG. 11 in this application, and therefore can achieve same effect as that of the foregoing method.

Figure 22:
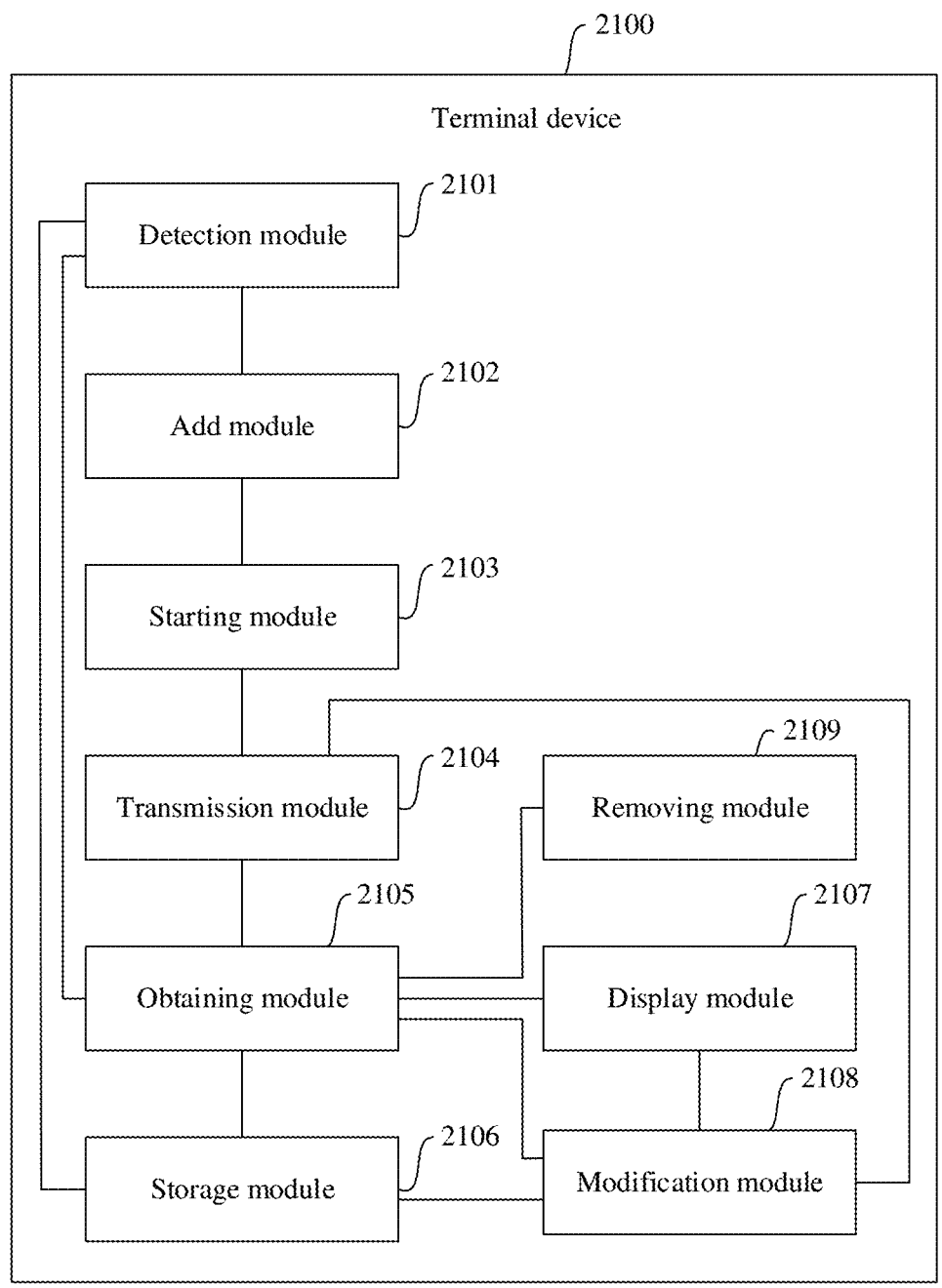
FIG. 22 is a diagram of a structure of a terminal device according to still another embodiment of this application.

FIG. 22 is a diagram of a structure of a terminal device according to still another embodiment of this application. Compared with the terminal device shown in FIG. 21, a difference lies in that in this embodiment, the terminal device 2100 may further include a display module 2107.

The detection module 2101 is further configured to: after the storage module 2106 stores the picture content in the second internal storage area, detect a second trigger operation of unlocking the target album by the user.

The obtaining module 2105 is further configured to: in response to the second trigger operation, obtain unlocking information entered by the user; and after it is determined that security verification on the unlocking information succeeds, obtain, based on an identifier of the target album, a picture name included in the target album.

The transmission module 2104 is configured to transfer a to-be-viewed picture name to the system application through the file opening interface.

The obtaining module 2105 is further configured to: after the system application opens a to-be-viewed picture file based on the to-be-viewed picture name, obtain a second file descriptor that is of the to-be-viewed picture file and that is returned by the system application.

The display module 2107 is configured to read and display to-be-viewed picture content based on the second file descriptor by using the gallery.

In addition, the terminal device 2100 may further include a modification module 2108.

The transmission module 2104 is further configured to: after the obtaining module 2105 obtains the picture name included in the target album, transfer a picture name of to-be-modified picture content to the system application through the file opening interface.

The obtaining module 2105 is further configured to: after the system application opens a picture file of the to-be-modified picture content based on the picture name of the to-be-modified picture content, obtain a third file descriptor that is of the picture file of the to-be-modified picture content and that is returned by the system application.

The display module 2107 is configured to read and display the to-be-modified picture content based on the third file descriptor by using the gallery.

The modification module 2108 is configured to modify the to-be-modified picture content by using the gallery.

The storage module 2106 is configured to store modified picture content in the second internal storage area based on the third file descriptor.

Further, the obtaining module 2105 is further configured to: after obtaining the picture name included in the target album, obtain a picture name of to-be-modified picture file information by using the gallery.

The modification module 2108 is configured to modify the to-be-modified picture file information by using the gallery.

The transmission module 2104 is configured to transfer the picture name of the to-be-modified picture file information and modified picture file information to the system application through a picture information modification interface between the gallery and the system application, so that after finding a picture file corresponding to the picture name of the to-be-modified picture file information, the system application replaces file information of the found picture file with the modified picture file information.

In addition, the obtaining module 2105 is further configured to: after obtaining the picture name included in the target album, obtain, by using the gallery, a to-be-deleted picture name.

The transmission module 2104 is configured to transfer the to-be-deleted picture name to the system application through a picture deletion interface between the gallery and the system application, so that the system application deletes a picture file corresponding to the to-be-deleted picture name.

Further, the terminal device 2100 may further include a removing module 2109.

The detection module 2101 is further configured to: after the add module 2102 adds the album lock to the target album, detect a third trigger operation of removing the album lock of the target album by the user.

The obtaining module 2105 is further configured to: in response to the third trigger operation, obtain unlocking information entered by the user.

The removing module 2109 is further configured to: after it is determined that security verification on the unlocking information succeeds, remove the album lock for the target album.

In this embodiment, a storage area clearing entry of the system application is in a user-invisible state.

It should be noted that all related content of the steps in the method embodiments shown in FIG. 11 to FIG. 20C in this application may be cited in function description of corresponding function modules. Details are not described herein again.

The terminal device 2100 provided in this embodiment is configured to perform the picture storage method provided in the embodiments shown in FIG. 11 to FIG. 20C in this application, and therefore can achieve same effect as that of the foregoing method.

It should be understood that the terminal device 2100 may correspond to the terminal device 100 shown in FIG. 5. Functions of the detection module 2101 to the storage module 2106 and functions of the modification module 2108 and the removing module 2109 may be implemented by the processor 110 in the terminal device 100 shown in FIG. 5, and functions of the display module 2107 may be implemented by the processor 110 and the display 194 in the terminal device 100 shown in FIG. 5.

When an integrated unit is used, the terminal device 2100 may include a processing module, a storage module, and a communication module.

The processing module may be configured to control and manage an action of the terminal device 2100. For example, the processing module may be configured to support the terminal device 2100 in performing the steps performed by the detection module 2101 to the removing module 2109. The storage module may be configured to support the terminal device 2100 in storing program code, data, and the like. The communication module may be configured to support communication between the terminal device 2100 and another device.

The processing module may be a processor or a controller, and may implement or execute various example logic blocks, modules, and circuits described with reference to content disclosed in this application. The processor may alternatively be a combination for implementing a computing function, for example, a combination including one or more microprocessors or a combination of a digital signal processor (DSP) and a microprocessor. The storage module may be a memory. The communication module may be specifically a device, for example, a radio frequency circuit, a Bluetooth chip, and/or a Wi-Fi chip, that interacts with another electronic device.

In an embodiment, when the processing module is a processor and the storage module is a memory, the terminal device 2100 in this embodiment may be a device having the structure shown in FIG. 5.

An embodiment of this application further provides a computer-readable storage medium. The computer-readable storage medium stores a computer program. When the computer program is run on a computer, the computer is enabled to perform the method provided in the embodiments shown in FIG. 11 to FIG. 20C in this application.

An embodiment of this application further provides a computer program product. The computer program product includes a computer program. When the computer program is run on a computer, the computer is enabled to perform the method provided in the embodiments shown in FIG. 11 to FIG. 20C in this application.

In embodiments of this application, "at least one" refers to one or more, and "a plurality of" refers to two or more. For example, A and/or B may represent the following three cases: Only A exists, both A and B exist, and only B exists. A and B may be singular or plural. The character "/" generally indicates an "or" relationship between the associated objects. "At least one of the following" and similar expressions refer to any combination of these terms, including any combination of single or plural terms. For example, at least one of a, b, or c may indicate a, b, c, a and b, a and c, b and c, or a, b, and c, where a, b, and c may be singular or plural.

A person of ordinary skill in the art may be aware that the units and algorithm steps described in embodiments disclosed in this specification can be implemented by a combination of electronic hardware, computer software, and electronic hardware. Whether a function is performed by hardware or software depends on a particular application and a design constraint of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, when any function is implemented in a form of a software function unit and sold or used as an independent product, the function may be stored on a computer-readable storage medium. Based on such an understanding, the technical solutions of this application essentially, or the part contributing to the conventional technology, some of the technical solutions may be implemented in the form of a software product. The computer software product is stored in a storage medium and includes several instructions for instructing a computing device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of embodiments of this application. Any variation or replacement readily figured out by a person skilled in the art within the technical scope disclosed in this application shall fall within the protection scope in embodiments of this application. Therefore, the protection scope of this application shall be subject to the protection scope of the claims.

What is claimed is:

1. A method, comprising:
    detecting a first trigger operation of adding an album lock to a target album by a user, wherein the target album is stored in a first internal storage area corresponding to a gallery;
    in response to the first trigger operation:
        adding the album lock to the target album; and
        starting a system application corresponding to the album lock;
    sending a picture name in the target album to the system application through a file opening interface between the gallery and the system application;
    in response to a second internal storage area corresponding to the system application not comprising a picture file corresponding to the picture name:
        creating the picture file in the second internal storage area;
        obtaining a first file descriptor of the picture file; and
        returning the first file descriptor of the picture file to the gallery;
    obtaining picture content written by the gallery into the second internal storage area based on the first file descriptor;
    disabling the file opening interface; and
    storing the picture content in the second internal storage area.

2. The method according to claim 1, wherein after disabling the file opening interface, and after storing the picture content in the second internal storage area, the method further comprises:
    detecting a second trigger operation of unlocking the target album by the user;

in response to the second trigger operation, obtaining unlocking information entered by the user;

after determining that security verification on the unlocking information succeeds, obtaining, based on an identifier of the target album, the picture name comprised in the target album;

transferring a to-be-viewed picture name to the system application through the file opening interface;

after the system application opens a to-be-viewed picture file based on the to-be-viewed picture name, obtaining a second file descriptor of the to-be-viewed picture file and that is returned by the system application; and reading and displaying to-be-viewed picture content based on the second file descriptor by using the gallery.

3. The method according to claim 2, wherein after obtaining the picture name comprised in the target album, the method further comprises:

transferring a picture name of to-be-modified picture content to the system application through the file opening interface;

after the system application opens a picture file of the to-be-modified picture content based on the picture name of the to-be-modified picture content, obtaining a third file descriptor of the picture file of the to-be-modified picture content and that is returned by the system application;

reading and displaying the to-be-modified picture content based on the third file descriptor by using the gallery;

modifying the to-be-modified picture content by using the gallery; and storing modified picture content in the second internal storage area based on the third file descriptor by using the gallery.

4. The method according to claim 2, wherein after obtaining the picture name comprised in the target album, the method further comprises:

obtaining a picture name of to-be-modified picture file information by using the gallery;

modifying the to-be-modified picture file information by using the gallery; and transferring the picture name of the to-be-modified picture file information and modified picture file information to the system application through a picture information modification interface between the gallery and the system application, wherein after finding a found picture file corresponding to the picture name of the to-be-modified picture file information, the system application replaces file information of the found picture file with the modified picture file information.

5. The method according to claim 2, wherein after obtaining the picture name comprised in the target album, the method further comprises:

obtaining a to-be-deleted picture name by using the gallery; and transferring the to-be-deleted picture name to the system application through a picture deletion interface between the gallery and the system application, wherein the system application deletes a picture file corresponding to the to-be-deleted picture name.

6. The method according to claim 1, wherein after adding the album lock to the target album, the method further comprises:

detecting a third trigger operation of removing the album lock of the target album by the user;

in response to the third trigger operation, obtaining unlocking information entered by the user; and after determining that security verification on the unlocking information succeeds, removing the album lock for the target album.

7. The method according to claim 1, wherein a storage area clearing entry of the system application is in a user-invisible state.

8. A device, comprising:

one or more processors, at least one memory, a plurality of applications, and one or more computer programs, wherein the one or more computer programs are stored in the at least one memory, the one or more computer programs comprise instructions, and when the instructions are executed by the one or more processors, the device is caused to:

detect a first trigger operation of adding an album lock to a target album by a user, wherein the target album is stored in a first internal storage area corresponding to a gallery;

in response to the first trigger operation:
  add the album lock to the target album; and
  start a system application corresponding to the album lock;

send a picture name in the target album to the system application through a file opening interface between the gallery and the system application;

in response to a second internal storage area corresponding to the system application not comprising a picture file corresponding to the picture name:
  create the picture file in the second internal storage area;
  obtain a first file descriptor of the picture file; and
  return the first file descriptor of the picture file to the gallery;

obtain picture content written by the gallery into the second internal storage area based on the first file descriptor;

disable the file opening interface; and store the picture content in the second internal storage area.

9. The device according to claim 8, wherein when the instructions are executed by the one or more processors, after disabling the file opening interface, and after storing the picture content in the second internal storage area, the device is further caused to:

detect a second trigger operation of unlocking the target album by the user;

in response to the second trigger operation, obtain unlocking information entered by the user;

after determining that security verification on the unlocking information succeeds, obtaining, based on an identifier of the target album, the picture name comprised in the target album;

transfer a to-be-viewed picture name to the system application through the file opening interface;

after the system application opens a to-be-viewed picture file based on the to-be-viewed picture name, obtain a second file descriptor of the to-be-viewed picture file and that is returned by the system application; and read and display to-be-viewed picture content based on the second file descriptor by using the gallery.

10. The device according to claim 9, wherein when the instructions are executed by the one or more processors, after obtaining the picture name comprised in the target album, the device is further caused to:

transfer a picture name of to-be-modified picture content to the system application through the file opening interface;

after the system application opens a picture file of the to-be-modified picture content based on the picture name of the to-be-modified picture content, obtain a third file descriptor that is of the picture file of the to-be-modified picture content and that is returned by the system application;
read and display the to-be-modified picture content based on the third file descriptor by using the gallery;
modify the to-be-modified picture content by using the gallery; and
store modified picture content in the second internal storage area based on the third file descriptor by using the gallery.

11. The device according to claim 9, wherein when the instructions are executed by the one or more processors, after obtaining the picture name comprised in the target album, the device is further caused to:
obtain a picture name of to-be-modified picture file information by using the gallery;
modify the to-be-modified picture file information by using the gallery; and
transfer the picture name of the to-be-modified picture file information and modified picture file information to the system application through a picture information modification interface between the gallery and the system application, wherein after finding a found picture file corresponding to the picture name of the to-be-modified picture file information, the system application replaces file information of the found picture file with the modified picture file information.

12. The device according to claim 9, wherein when the instructions are executed by the one or more processors, after obtaining the picture name comprised in the target album, the device is further caused to:
obtain a to-be-deleted picture name by using the gallery; and
transfer the to-be-deleted picture name to the system application through a picture deletion interface between the gallery and the system application, wherein the system application deletes a picture file corresponding to the to-be-deleted picture name.

13. The device according to claim 8, wherein when the instructions are executed by the one or more processors, after adding the album lock to the target album, the device is further caused to:
detect a third trigger operation of removing the album lock of the target album by the user;
in response to the third trigger operation, obtaining unlocking information entered by the user; and
after determining that security verification on the unlocking information succeeds, removing the album lock for the target album.

14. The device according to claim 8, wherein a storage area clearing entry of the system application is in a user-invisible state.

15. A non-transitory computer-readable medium having processor-executable instructions stored thereon, wherein the processor-executable instructions, when executed by at least one processor, configure the at least one processor for:
detecting a first trigger operation of adding an album lock to a target album by a user, wherein the target album is stored in a first internal storage area corresponding to a gallery;
in response to the first trigger operation:
adding the album lock to the target album; and
starting a system application corresponding to the album lock;
sending a picture name in the target album to the system application through a file opening interface between the gallery and the system application;
in response to a second internal storage area corresponding to the system application not comprising a picture file corresponding to the picture name:
creating the picture file in the second internal storage area;
obtaining a first file descriptor of the picture file; and
returning the first file descriptor of the picture file to the gallery;
obtaining picture content written by the gallery into the second internal storage area based on the first file descriptor;
disabling the file opening interface; and
storing the picture content in the second internal storage area.

16. The non-transitory computer-readable medium according to claim 15, wherein the processor-executable instructions, when executed by the at least one processor, after disabling the file opening interface, and after storing the picture content in the second internal storage area, further configure the at least one processor for:
detecting a second trigger operation of unlocking the target album by the user;
in response to the second trigger operation, obtaining unlocking information entered by the user;
after determining that security verification on the unlocking information succeeds, obtaining, based on an identifier of the target album, the picture name comprised in the target album;
transferring a to-be-viewed picture name to the system application through the file opening interface;
after the system application opens a to-be-viewed picture file based on the to-be-viewed picture name, obtaining a second file descriptor of the to-be-viewed picture file and that is returned by the system application; and
reading and displaying to-be-viewed picture content based on the second file descriptor by using the gallery.

17. The non-transitory computer-readable medium according to claim 16, wherein the processor-executable instructions, when executed by the at least one processor, after obtaining the picture name comprised in the target album, further configure the at least one processor for:
transferring a picture name of to-be-modified picture content to the system application through the file opening interface;
after the system application opens a picture file of the to-be-modified picture content based on the picture name of the to-be-modified picture content, obtaining a third file descriptor of the picture file of the to-be-modified picture content and that is returned by the system application;
reading and displaying the to-be-modified picture content based on the third file descriptor by using the gallery;
modifying the to-be-modified picture content by using the gallery; and
storing modified picture content in the second internal storage area based on the third file descriptor by using the gallery.

18. The non-transitory computer-readable medium according to claim 16, wherein the processor-executable instructions, when executed by the at least one processor, after obtaining the picture name comprised in the target album, further configure the at least one processor for:
obtaining a picture name of to-be-modified picture file information by using the gallery;

modifying the to-be-modified picture file information by using the gallery; and transferring the picture name of the to-be-modified picture file information and modified picture file information to the system application through a picture information modification interface between the gallery and the system application, wherein after finding a found picture file corresponding to the picture name of the to-be-modified picture file information, the system application replaces file information of the found picture file with the modified picture file information.

19. The non-transitory computer-readable medium according to claim 16, wherein the processor-executable instructions, when executed by the at least one processor, after obtaining the picture name comprised in the target album, further configure the at least one processor for:

obtaining a to-be-deleted picture name by using the gallery; and transferring the to-be-deleted picture name to the system application through a picture deletion interface between the gallery and the system application, wherein the system application deletes a picture file corresponding to the to-be-deleted picture name.

20. The non-transitory computer-readable medium according to claim 15, wherein the processor-executable instructions, when executed by the at least one processor, after adding the album lock to the target album, further configure the at least one processor for:

detecting a third trigger operation of removing the album lock of the target album by the user;

in response to the third trigger operation, obtaining unlocking information entered by the user; and after determining that security verification on the unlocking information succeeds, removing the album lock for the target album.

* * * * *